US010001822B2

(12) United States Patent
Ganor et al.

(10) Patent No.: US 10,001,822 B2
(45) Date of Patent: Jun. 19, 2018

(54) INTEGRATING A POWER ARBITER IN A PROCESSOR

(71) Applicant: Intel Corporation, Santa Clara, CA (US)

(72) Inventors: Assaf Ganor, Hertzeliya (IL); Efraim Rotem, Haifa (IL); Noam Winer, Haifa (IL); Omer Vikinski, Haifa (IL)

(73) Assignee: Intel Corporation, Santa Clara, CA (US)

( * ) Notice: Subject to any disclaimer, the term of this patent is extended or adjusted under 35 U.S.C. 154(b) by 121 days.

(21) Appl. No.: 14/860,854

(22) Filed: Sep. 22, 2015

(65) Prior Publication Data

US 2017/0083067 A1 Mar. 23, 2017

(51) Int. Cl.
*G06F 1/18* (2006.01)
*G06F 1/26* (2006.01)

(52) U.S. Cl.
CPC . *G06F 1/26* (2013.01); *G06F 1/18* (2013.01)

(58) Field of Classification Search
CPC .................................... G06F 1/18; G06F 1/26
See application file for complete search history.

(56) References Cited

U.S. PATENT DOCUMENTS

| | | | |
|---|---|---|---|
| 5,163,153 | A | 11/1992 | Cole et al. |
| 5,522,087 | A | 5/1996 | Hsiang |
| 5,590,341 | A | 12/1996 | Matter |
| 5,621,250 | A | 4/1997 | Kim |
| 5,931,950 | A | 8/1999 | Hsu |
| 6,748,546 | B1 | 6/2004 | Mirov et al. |
| 6,792,392 | B1 | 9/2004 | Knight |
| 6,823,516 | B1 | 11/2004 | Cooper |
| 6,829,713 | B2 | 12/2004 | Cooper et al. |
| 6,996,728 | B2 | 2/2006 | Singh |
| 7,010,708 | B2 | 3/2006 | Ma |
| 7,043,649 | B2 | 5/2006 | Terrell |
| 7,093,147 | B2 | 8/2006 | Farkas et al. |
| 7,111,179 | B1 | 9/2006 | Girson et al. |
| 7,194,643 | B2 | 3/2007 | Gonzalez et al. |
| 7,272,730 | B1 | 9/2007 | Acquaviva et al. |

(Continued)

FOREIGN PATENT DOCUMENTS

| | | |
|---|---|---|
| EP | 1 282 030 A1 | 5/2003 |

OTHER PUBLICATIONS

International Searching Authority, "Notification of Transmittal of the International Search Report and the Written Opinion of the International Searching Authority," dated Nov. 22, 2016 in International application No. PCT/US2016/047991.

(Continued)

*Primary Examiner* — Albert Wang
(74) *Attorney, Agent, or Firm* — Trop, Pruner & Hu, P.C.

(57) ABSTRACT

In one embodiment, a processor includes: a power switcher circuit to receive a first voltage and charge at least one charge storage device with the first voltage in a first phase and output charge in a second phase; a selection circuit coupled to the power switcher circuit to couple the output charge to a selected one of a plurality of load circuits responsive to a control signal; and a control circuit to generate the control signal based at least in part on a comparison of a feedback voltage of a rail coupled to the selected load circuit to a reference voltage. Other embodiments are described and claimed.

23 Claims, 20 Drawing Sheets

100
110
Core
IVR 125a
120a
Core
IVR 125n
163
PCU 138
162
120n
External VR 160
Power Supply 150
Vreg
IVR 125x
126
128
129
PSC
Selection Circuit
Control Logic
IF 132
PCIe IF 134
IMC 136

(56) References Cited

U.S. PATENT DOCUMENTS 7,412,615 B2 8/2008 Yokota et al.
7,434,073 B2 10/2008 Magklis
7,437,270 B2 10/2008 Song et al.
7,454,632 B2 11/2008 Kardach et al.
7,529,956 B2 5/2009 Stufflebeam
7,539,885 B2 5/2009 Ma
7,730,340 B2 6/2010 Hu et al.
9,116,692 B1 8/2015 Krein et al.
2001/0044909 A1 11/2001 Oh et al.
2002/0194509 A1 12/2002 Plante et al.
2003/0061383 A1 3/2003 Zilka
2004/0064752 A1 4/2004 Kazachinsky et al.
2004/0098560 A1 5/2004 Storvik et al.
2004/0139356 A1 7/2004 Ma
2004/0268166 A1 12/2004 Farkas et al.
2005/0022038 A1 1/2005 Kaushik et al.
2005/0033881 A1 2/2005 Yao
2005/0132238 A1 6/2005 Nanja
2006/0050670 A1 3/2006 Hillyard et al.
2006/0053326 A1 3/2006 Naveh
2006/0059286 A1 3/2006 Bertone et al.
2006/0069936 A1 3/2006 Lint et al.
2006/0117202 A1 6/2006 Magklis et al.
2006/0184287 A1 8/2006 Belady et al.
2007/0005995 A1 1/2007 Kardach et al.
2007/0016817 A1 1/2007 Albonesi et al.
2007/0079294 A1 4/2007 Knight
2007/0106827 A1 5/2007 Boatright et al.
2007/0156992 A1 7/2007 Jahagirdar
2007/0180279 A1 8/2007 Sullam
2007/0214342 A1 9/2007 Newburn
2007/0239398 A1 10/2007 Song et al.
2007/0245163 A1 10/2007 Lu et al.
2008/0028240 A1 1/2008 Arai et al.
2008/0250260 A1 10/2008 Tomita
2009/0006871 A1 1/2009 Liu et al.
2009/0150695 A1 6/2009 Song et al.
2009/0150696 A1 6/2009 Song et al.
2009/0158061 A1 6/2009 Schmitz et al.
2009/0158067 A1 6/2009 Bodas et al.
2009/0172375 A1 7/2009 Rotem et al.
2009/0172428 A1 7/2009 Lee
2009/0235105 A1 9/2009 Branover et al.
2010/0115309 A1 5/2010 Carvalho et al.
2010/0138683 A1 6/2010 Burton et al.
2010/0146513 A1 6/2010 Song
2010/0191997 A1 7/2010 Dodeja et al.
2011/0093733 A1 4/2011 Kruglick
2011/0154090 A1 6/2011 Dixon et al.
2012/0079290 A1 3/2012 Kumar
2012/0246506 A1 9/2012 Knight
2012/0249223 A1* 10/2012 Neugebauer .......... H02M 3/073 327/536
2013/0061064 A1 3/2013 Ananthakrishnan et al.
2013/0080803 A1 3/2013 Ananthakrishnan et al.
2013/0080804 A1 3/2013 Ananthakrishnan et al.
2013/0097450 A1 4/2013 Patel
2013/0111120 A1 5/2013 Ananthakrishnan et al.
2013/0111121 A1 5/2013 Ananthakrishnan et al.
2013/0111226 A1 5/2013 Ananthakrishnan et al.
2013/0111236 A1 5/2013 Ananthakrishnan et al.
2013/0346774 A1 12/2013 Bhandaru et al.
2014/0068290 A1 3/2014 Bhandaru et al.
2014/0181545 A1* 6/2014 Shrall .................. G06F 1/3206 713/320
2014/0195829 A1 7/2014 Bhandaru et al.
2014/0208141 A1 7/2014 Bhandaru et al.

OTHER PUBLICATIONS

Intel Developer Forum, IDF2010, Opher Kahn, et al., “Intel Next Generation Microarchitecture Codename Sandy Bridge: New Processor Innovations,” Sep. 13, 2010, 58 pages.

SPEC-Power and Performance, Design Overview V1.10, Standard Performance Information Corp., Oct. 21, 2008, 6 pages.

Intel Technology Journal, “Power and Thermal Management in the Intel Core Duo Processor,” May 15, 2006, pp. 109-122.

Anoop Iyer, et al., “Power and Performance Evaluation of Globally Asynchronous Locally Synchronous Processors,” 2002, pp. 1-11.

Greg Semeraro, et al., “Hiding Synchronization Delays in a GALS Processor Microarchitecture,” 2004, pp. 1-13.

Joan-Manuel Parcerisa, et al., “Efficient Interconnects for Clustered Microarchitectures,” 2002, pp. 1-10.

Grigorios Magklis, et al., “Profile-Based Dynamic Voltage and Frequency Scalling for a Multiple Clock Domain Microprocessor,” 2003, pp. 1-12.

Greg Semeraro, et al., “Dynamic Frequency and Voltage Control for a Multiple Clock Domain Architecture,” 2002, pp. 1-12.

Greg Semeraro, “Energy-Efficient Processor Design Using Multiple Clock Domains with Dynamic Voltage and Frequency Scaling,” 2002, pp. 29-40.

Diana Marculescu, “Application Adaptive Energy Efficient Clustered Architectures,” 2004, pp. 344-349.

L. Benini, et al., “System-Level Dynamic Power Management,” 1999, pp. 23-31.

Ravindra Jejurikar, et al., “Leakage Aware Dynamic Voltage Scaling for Real-Time Embedded Systems,” 2004, pp. 275-280.

Ravindra Jejurikar, et al., “Dynamic Slack Reclamation With Procrastination Scheduling in Real-Time Embedded Systems,” 2005, pp. 13-17.

R. Todling, et al., “Some Strategies for Kalman Filtering and Smoothing,” 1996, pp. 1-21.

R.E. Kalman, “A New Approach to Linear Filtering and Prediction Problems,” 1960, pp. 1-12.

Intel Corporation, “Intel 64 and IA-32 Architectures Software Developer’s Manual,” vol. 3 (3A, 3B & 3C): System Programming Guide, Feb. 2014, Chapter 14 Power and Thermal Management (14.1-14.9.5), 44 pages.

* cited by examiner

200

INTEGRATING A POWER ARBITER IN A PROCESSOR

FIELD OF THE INVENTION

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Figure 1:
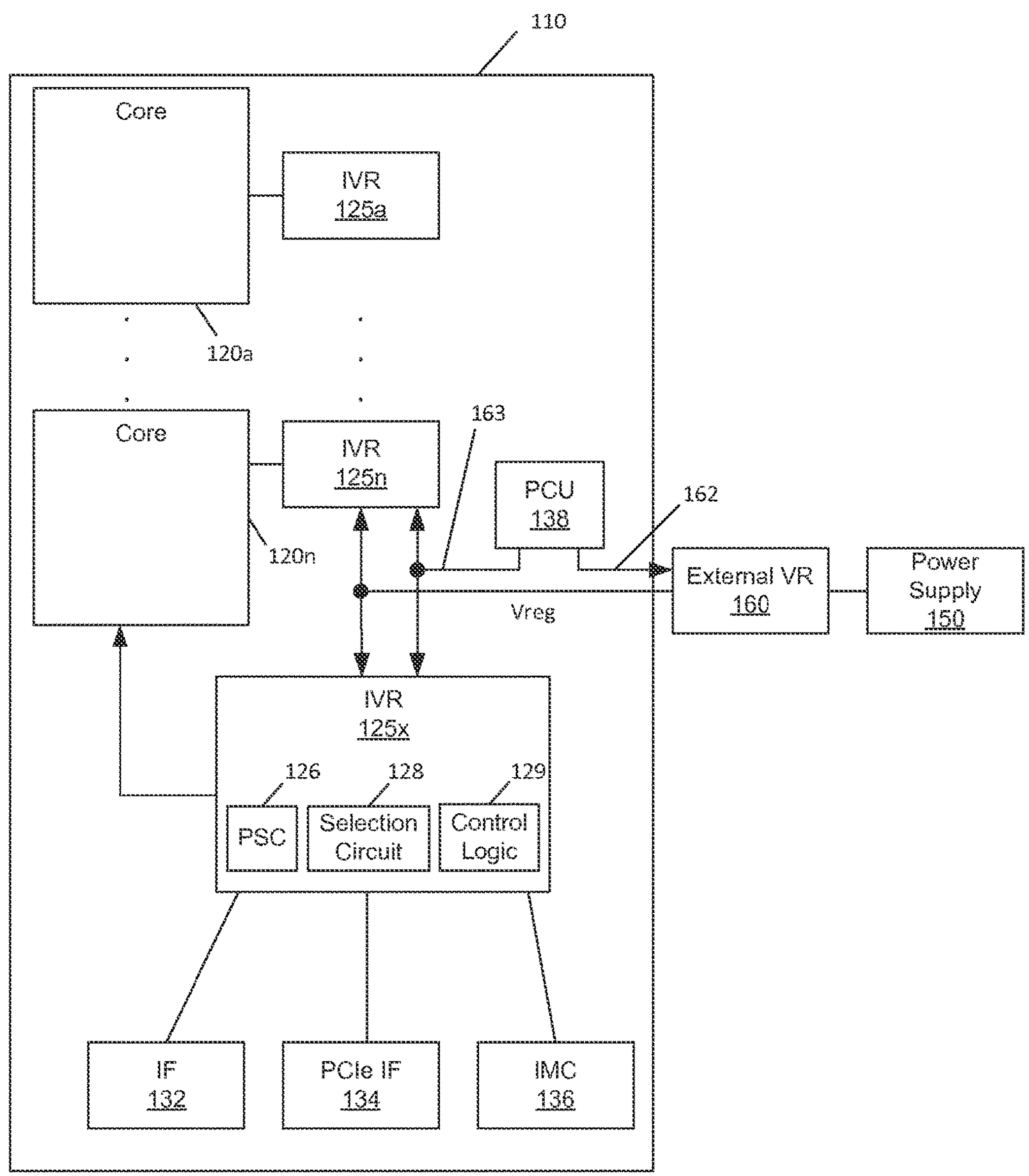
FIG. 1 is a block diagram of a portion of a system in accordance with an embodiment of the present invention.

In various embodiments, greater power efficiency for an integrated circuit can be realized by providing one or more integrated voltage regulators that switchably couple charge to selected ones of multiple voltage rails of the integrated circuit. This switching may be based on a power arbitration scheme implemented by a power arbiter circuit which, in some embodiments, may be implemented within the integrated voltage regulator itself. As such, embodiments enable a high efficiency integrated voltage regulator (IVR) implementation having a power arbiter, which may be implemented integrally to the IVR, that provides an internal voltage regulator (VR) for low current power paths (also referred to as "rails").

Embodiments may enable a power delivery architecture having switched capacitor-based power benefits with reductions in external bill of materials (BOM) area and cost, on-die pin count, switching die area, and accurate control over different internal rails. Although the scope of the present invention is not limited in this regard, embodiments may be used in connection with processors or systems on chip (SoCs), and/or for on-board power management integrated circuit (PMIC) regulators for incorporation in cost and form-factor sensitive systems. Using an embodiment, a reduced number of switcher blocks may be present, realizing package size, BOM cost, power, and area benefits.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage Vreg to processor 110.

As seen, processor 110 may be a single die processor including multiple cores 120*a*-120*n*. In addition, each core may be associated with an integrated voltage regulator (IVR) 125*a*-125*n* which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance.

In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered. Similarly, cores 120 may include or be associated with independent clock generation circuitry such as one or more phase lock loops (PLLs) to control operating frequency of each core 120 independently.

As further illustrated in FIG. 1, IVR 125*x* may be a power arbiter-controlled IVR as will be described further herein. To this end as illustrated, IVR 125*x* includes a power switching circuit 126 (which may take the form of a switch capacitor circuit, described further herein), a selection circuit 128 (which in an embodiment may take the form of a zero-loss multiplexer circuit), and a control logic 129, which may implement a power arbiter to selectively couple charge stored in power switching circuit 126 to a selected one of multiple voltage rails (such as shown coupled to core 120*n*). In this way, various load circuits within cores 120 or other portions of processor 110 may be provided with an operating voltage from this power arbiter-controlled IVR. In this way, reduced on-chip and off-chip components for powering at least certain circuitry of processor 110 can be realized.

Still referring to FIG. 1, additional components may be present within the processor including an input/output interface (IF) 132, another interface 134, and an integrated memory controller (IMC) 136. As seen, each of these components may be powered by another integrated voltage regulator $\mathbf{125}_x$. In one embodiment, interface 132 may enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include circuitry including hardware, software and/or firmware to perform power management operations with regard to processor 110. As seen, PCU 138 provides control information to external voltage regulator 160 via a digital interface 162 to cause the voltage regulator to generate the appropriate regulated voltage. PCU 138 also provides control information to IVRs 125 via another digital interface 163 to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software). In other cases, the power arbitration performed by control logic 129 may instead be implemented within PCU 138.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited. For example, other regulated voltages may be provided to on-chip resources from external voltage regulator 160 or one or more additional external sources of regulated voltages.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle.

Power management techniques also may be used when constraints exist in an operating environment. For example, when a power and/or thermal constraint is encountered, power may be reduced by reducing operating frequency and/or voltage. Other power management techniques include throttling instruction execution rate or limiting scheduling of instructions. Still further, it is possible for instructions of a given instruction set architecture to include express or implicit direction as to power management operations. Although described with these particular examples, understand that many other power management techniques may be used in particular embodiments.

Figure 2:
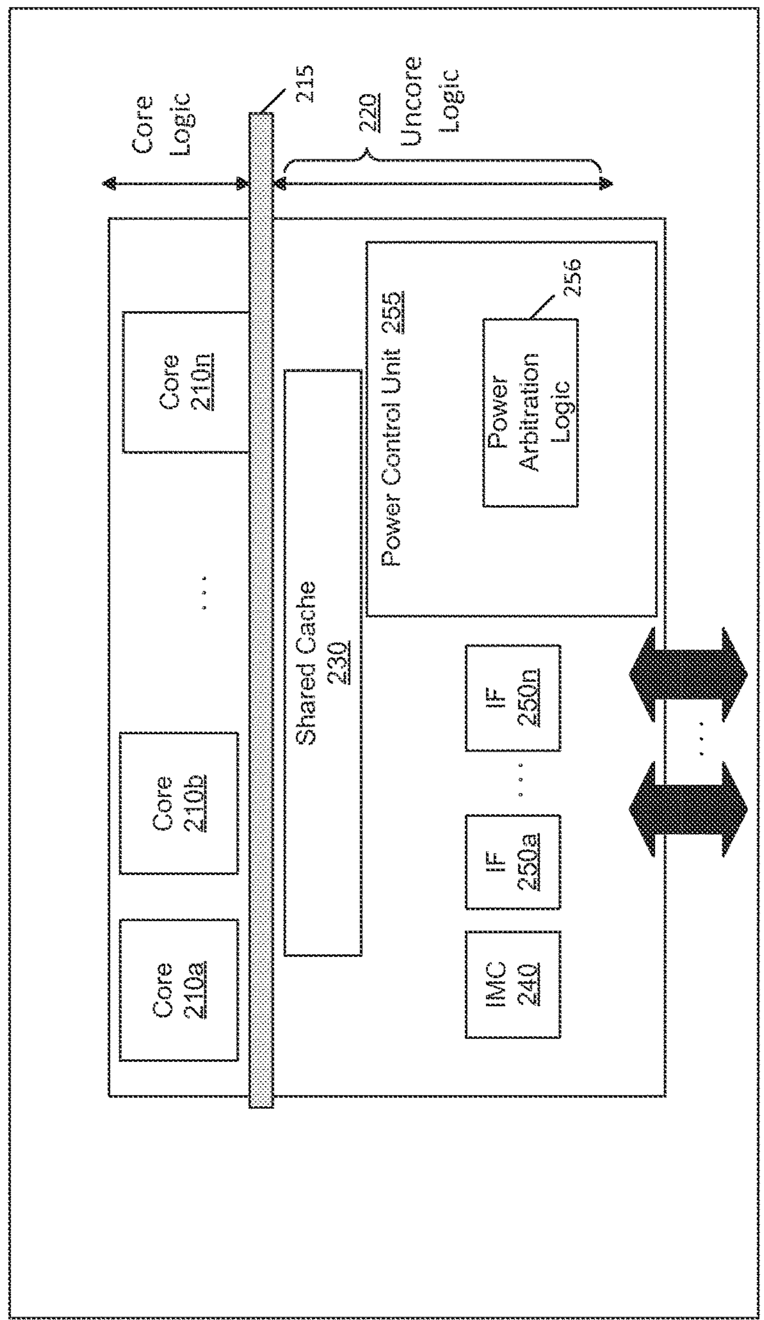
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $\mathbf{210}_a$-$\mathbf{210}_n$. In one embodiment, each such core may be of an independent power domain and can be configured to enter and exit active states and/or maximum performance states based on workload. One or more cores 210 may be heterogeneous to the other cores, e.g., having different micro-architectures, instruction set architectures, pipeline depths, power and performance capabilities. The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform power management techniques. In one embodiment, power control unit 255 may include a power arbitration logic 256, which may be used to selectively couple stored charge from a charge storage device or circuit to various components of processor 200, e.g., according to a round robin arbitration scheme, as described further herein.

In addition, by interfaces 250*a*-250*n*, connection can be made to various off-chip components such as peripheral devices, mass storage and so forth. While shown with this particular implementation in the embodiment of FIG. 2, the scope of the present invention is not limited in this regard.

Figure 3:
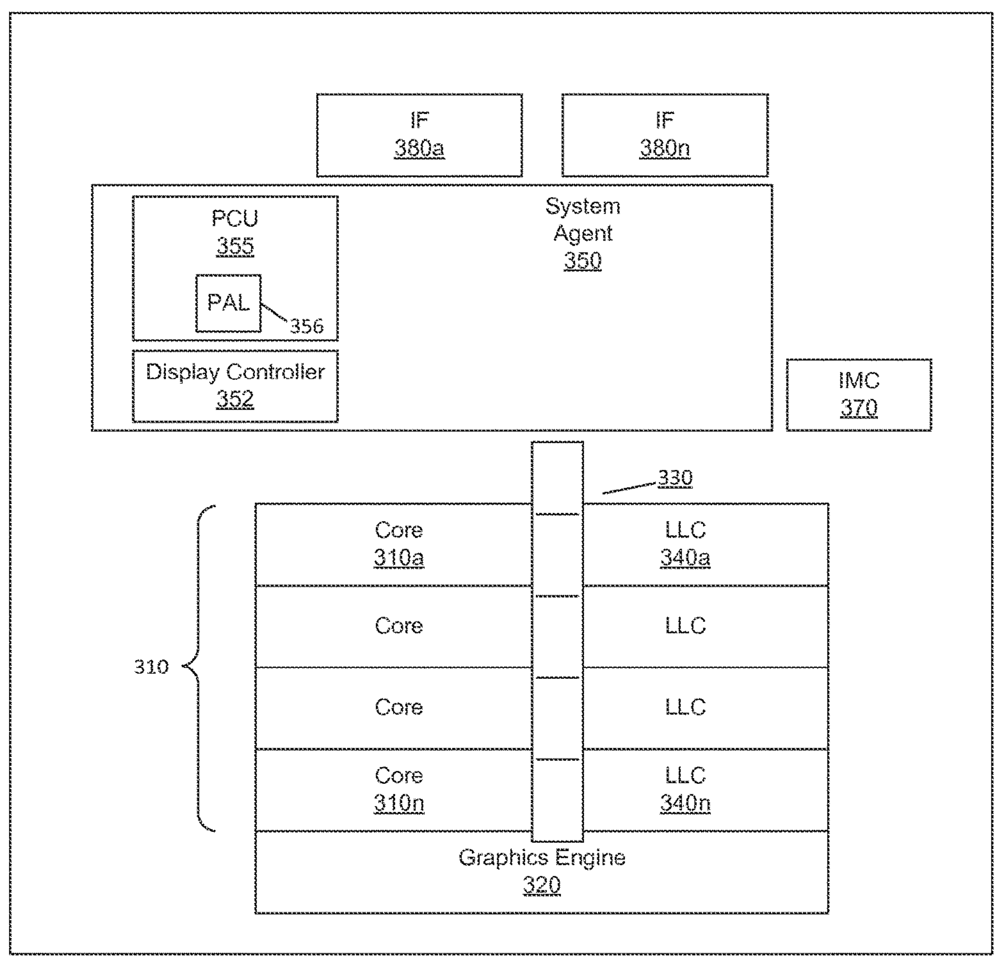
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores 310*a*-310*n*, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) 340*a*-340*n*. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques. As illustrated, power control unit 356 includes a power arbitration logic 356 which may perform power arbiter-controlled power delivery to various circuitry of processor 300.

As further seen in FIG. 3, processor 300 can further include an integrated memory controller (IMC) 370 that can provide for an interface to a system memory, such as a dynamic random access memory (DRAM). Multiple interfaces 380*a*-380*n* may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided.

Although shown at this high level in the embodiment of FIG. 3, understand the scope of the present invention is not limited in this regard.

Figure 4:
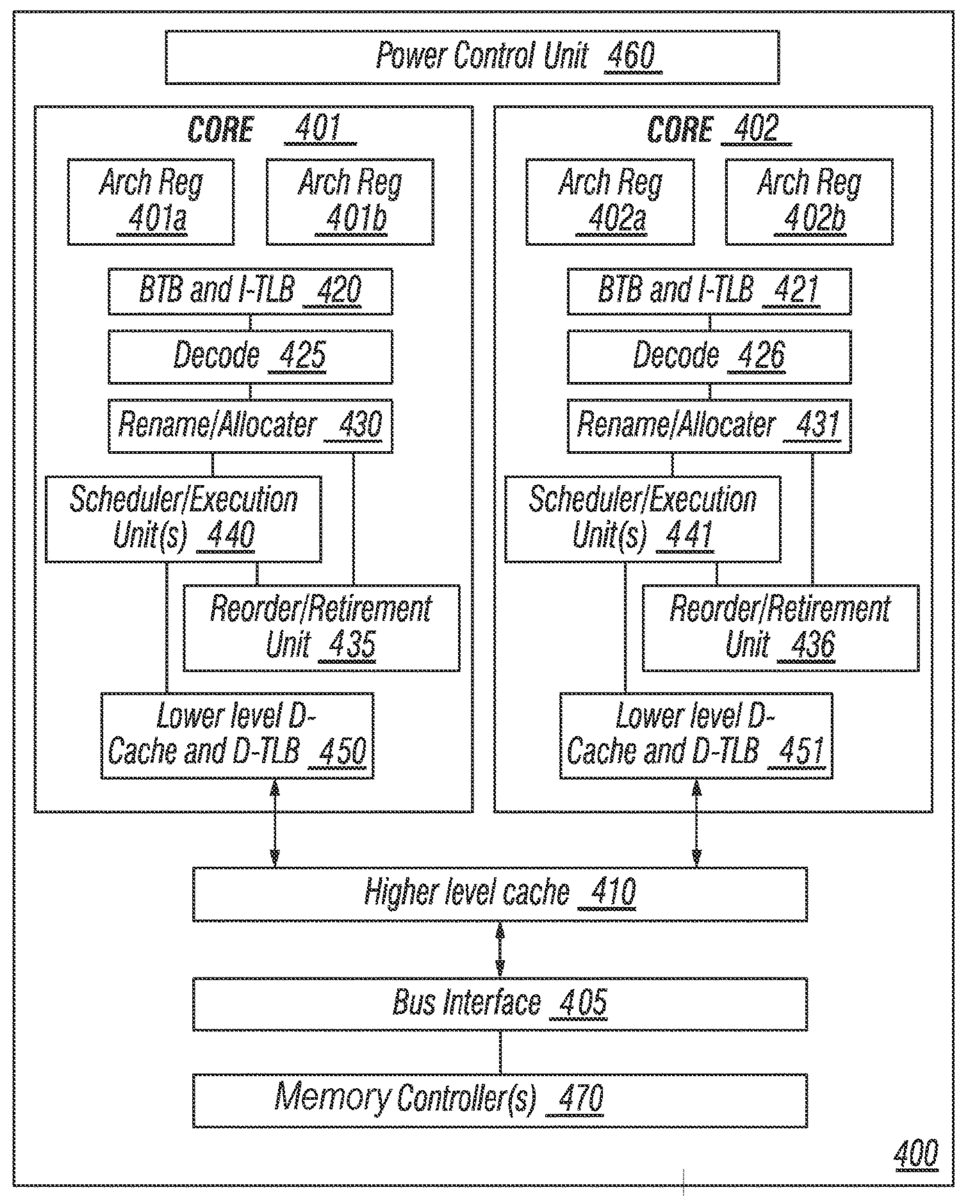
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401*a* and 401*b*, which may also be referred to as hardware thread slots 401*a* and 401*b*. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401*a*, a second thread is associated with architecture state registers 401*b*, a third thread may be associated with architecture state registers 402*a*, and a fourth thread may be associated with architecture state registers 402*b*. Here, each of the architecture state registers (401*a*, 401*b*, 402*a*, and 402*b*) may be referred to as processing elements, thread slots, or thread units, as described above. As illustrated, architecture state registers 401*a* are replicated in architecture state registers 401*b*, so individual architecture states/contexts are capable of being stored for logical processor 401*a* and logical processor 401*b*. In core 401, other smaller resources, such as instruction pointers and renaming logic in allocator and renamer block 430 may also be replicated for threads 401*a* and 401*b*. Some resources, such as re-order buffers in reorder/retirement unit 435, branch target buffer and instruction translation lookaside buffer (BTB and I-TLB) 420, load/store buffers, and queues may be shared through partitioning. Other resources, such as general purpose internal registers, page-table base register(s), low-level data-cache and data-TLB 450, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to a fetch unit to decode fetched elements. Fetch logic, in one embodiment, includes individual sequencers associated with thread slots 401*a*, 401*b*, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401*a* and 401*b* are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation lookaside buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power control unit 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
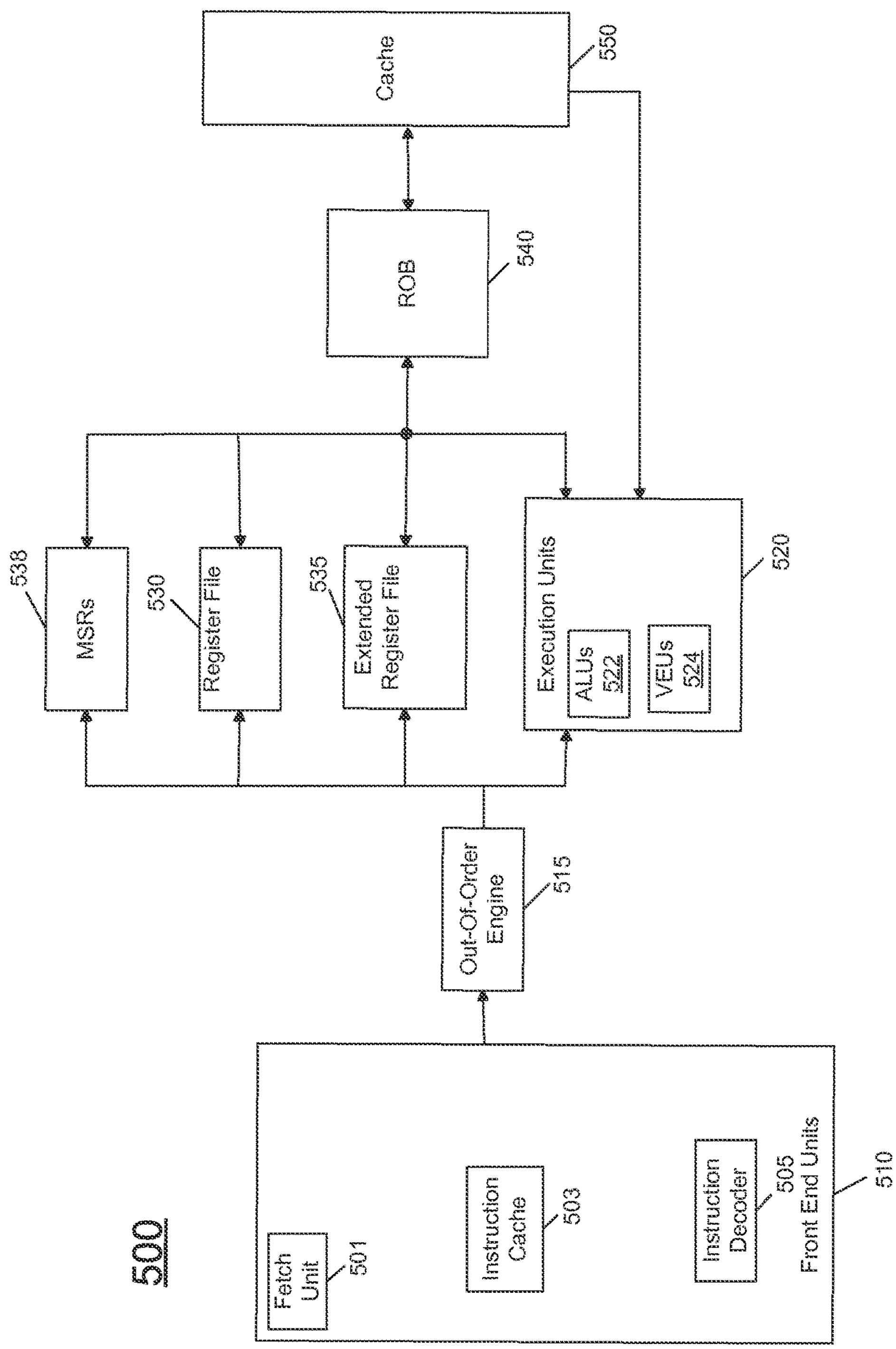
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator, including a power arbiter-controlled voltage regulator as described herein.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core).

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
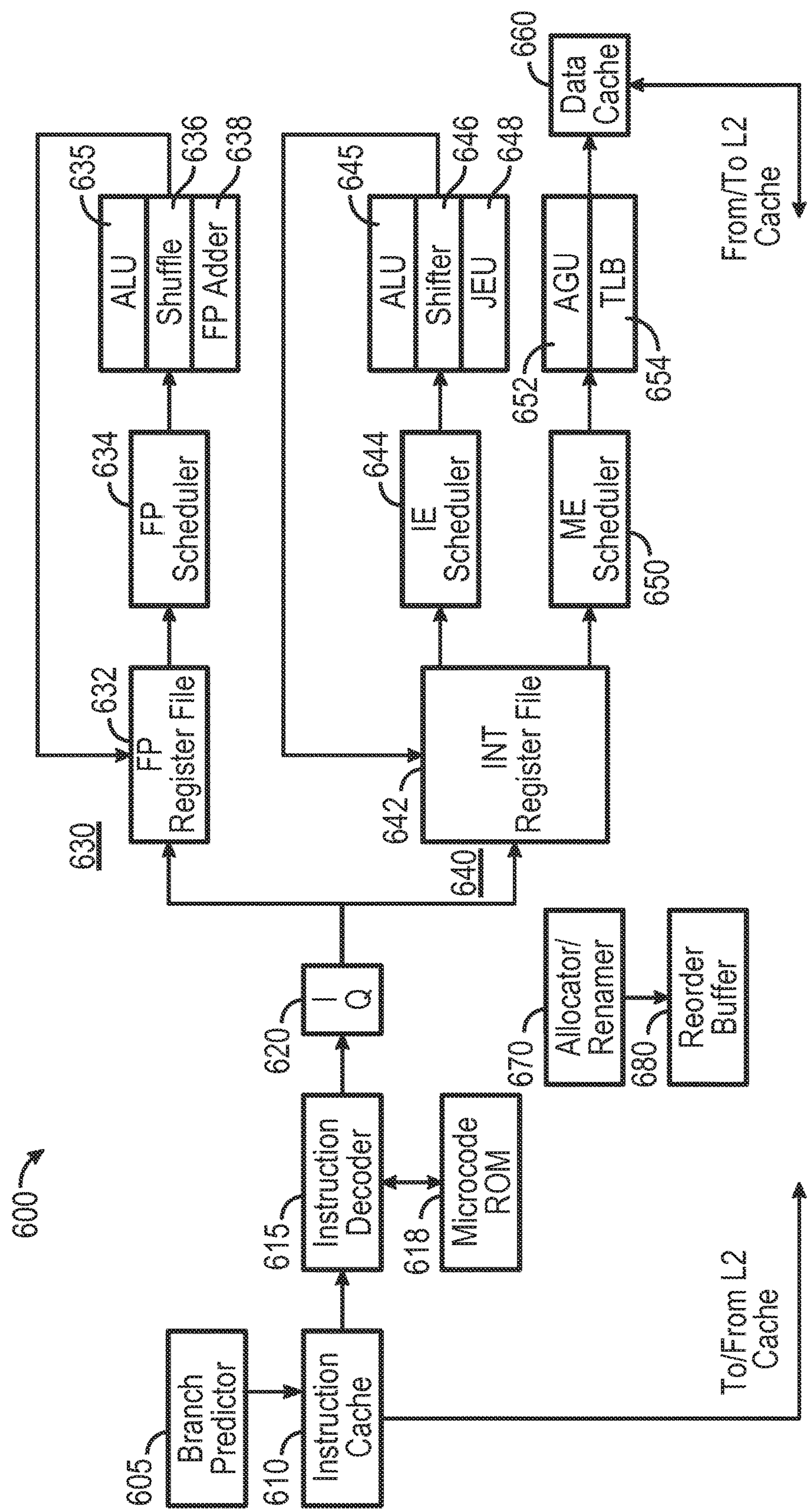
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue (IQ) 620 for storage and delivery to a given execution pipeline. A microcode ROM 618 is coupled to instruction decoder 615.

A floating point pipeline 630 includes a floating point (FP) register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer (INT) register file 642 which may include a plurality of architectural registers of a given bit with such as 128 or 256 bits. Pipeline 640 includes an integer execution (IE) scheduler 644 to schedule instructions for execution on one of multiple execution units of the pipeline. In the embodiment shown, such execution units include an ALU 645, a shifter unit 646, and a jump execution unit (JEU) 648. In turn, results generated in these execution units may be provided back to buffers and/or registers of register file 642. Of course understand while shown with these few example execution units, additional or different integer execution units may be present in another embodiment.

A memory execution (ME) scheduler 650 may schedule memory operations for execution in an address generation unit (AGU) 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
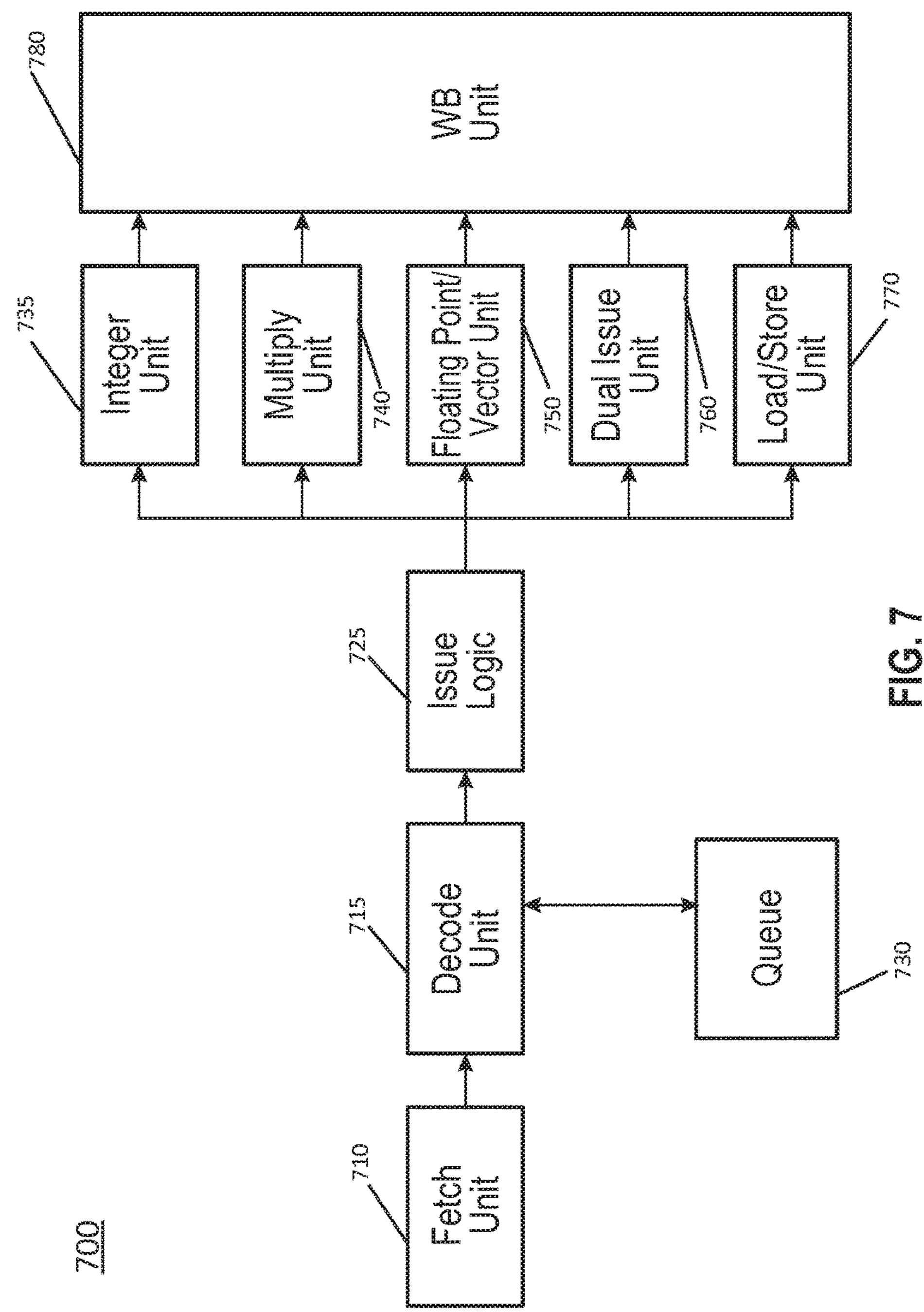
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback (WB) unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
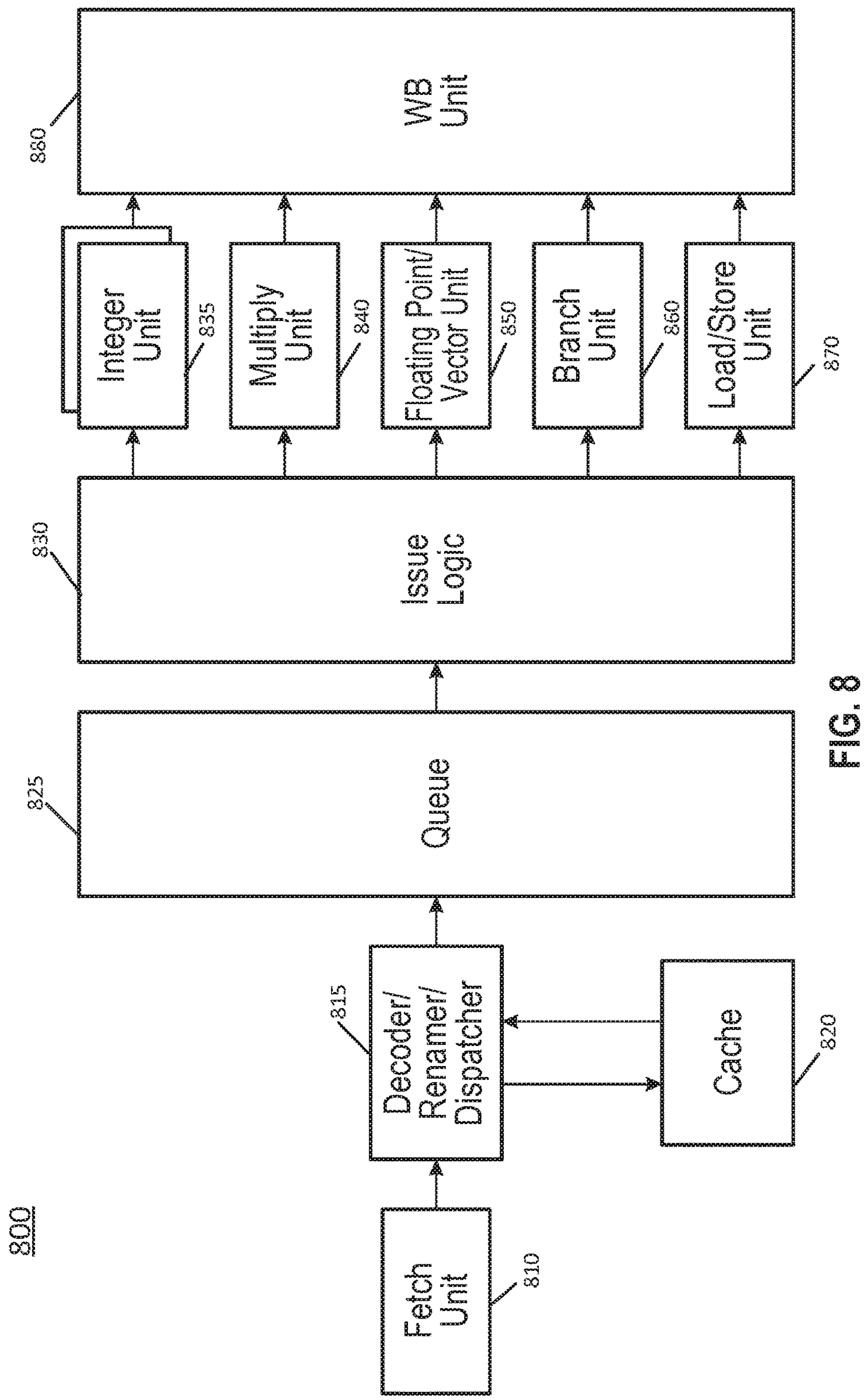
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher unit 815 coupled to a cache 820. Unit 815 may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
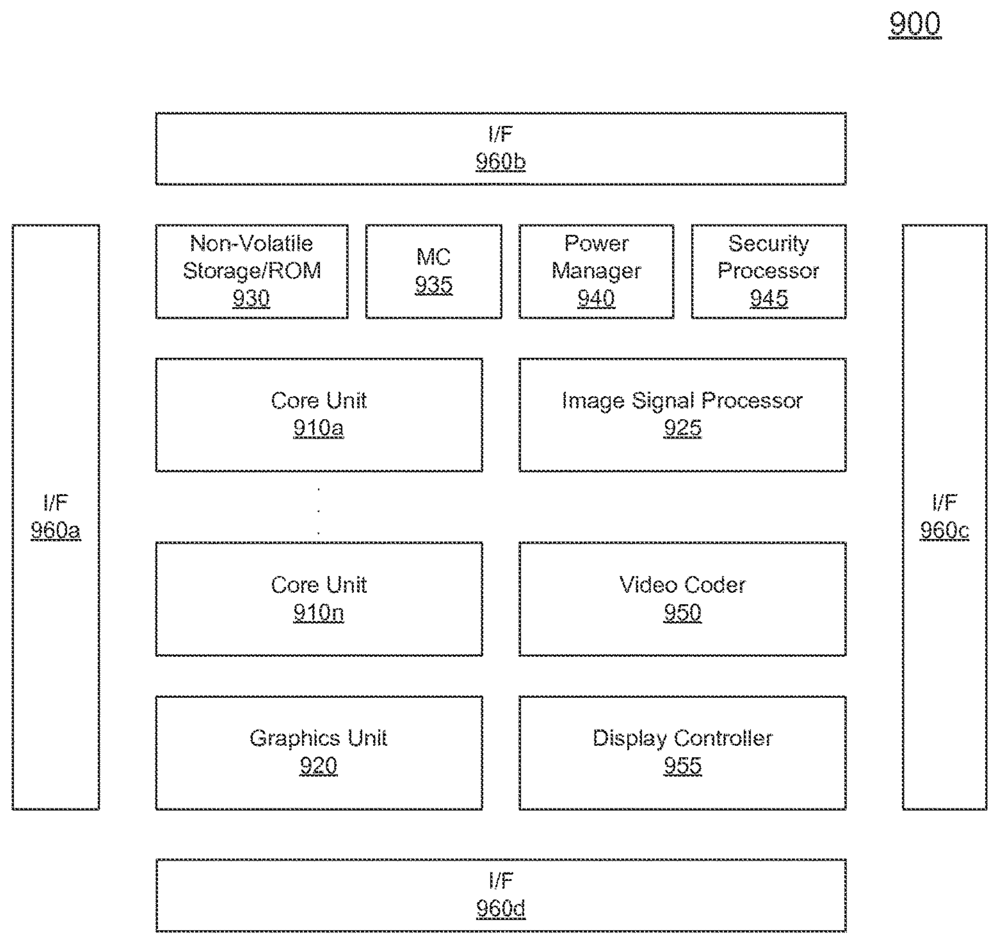
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency, some of which may receive an operating (or sustain) voltage from a power-arbiter controlled internal voltage regulator as described herein. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device, which may incorporate a heterogeneous system architecture having a heterogeneous system architecture-based processor design.

In the high level view shown in FIG. 9, processor 900 includes a plurality of core units 910*a*-910*n*. Each core unit may include one or more processor cores, one or more cache memories and other circuitry. Each core unit 910 may support one or more instruction sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level two (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth. Each of the units may have its power consumption controlled via a power manager 940, which may include control logic to perform various power management techniques.

In some embodiments, SoC 900 may further include a non-coherent fabric coupled to the coherent fabric to which various peripheral devices may couple. One or more interfaces 960*a*-960*d* enable communication with one or more off-chip devices. Such communications may be via a variety of communication protocols such as PCIe™, GPIO, USB, $I^2C$, UART, MIPI, SDIO, DDR, SPI, HDMI, among other types of communication protocols. Although shown at this high level in the embodiment of FIG. 9, understand the scope of the present invention is not limited in this regard.

Figure 10:
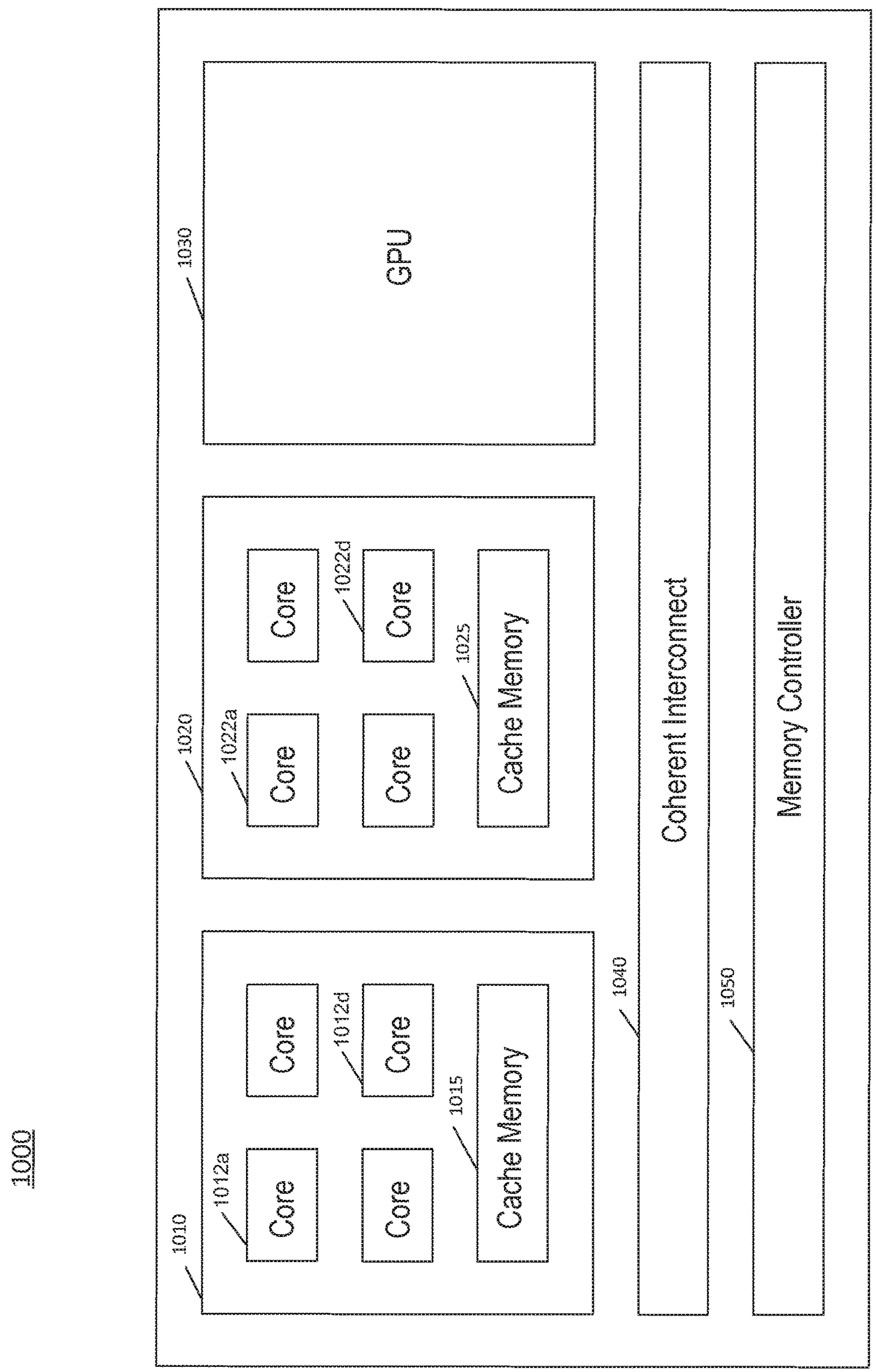
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores 1012*a*-1012*d*. In an example, these cores may be low power cores such as in-order cores. In one embodiment these first cores may be implemented as ARM Cortex A53 cores. At least these first cores may be powered by a power arbiter controlled integrated voltage regulator, as described herein. In turn, these cores couple to a cache memory 1015 of core domain 1010. In addition, SoC 1000 includes a second core domain 1020. In the illustration of FIG. 10, second core domain 1020 has a plurality of second cores 1022*a*-1022*d*. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
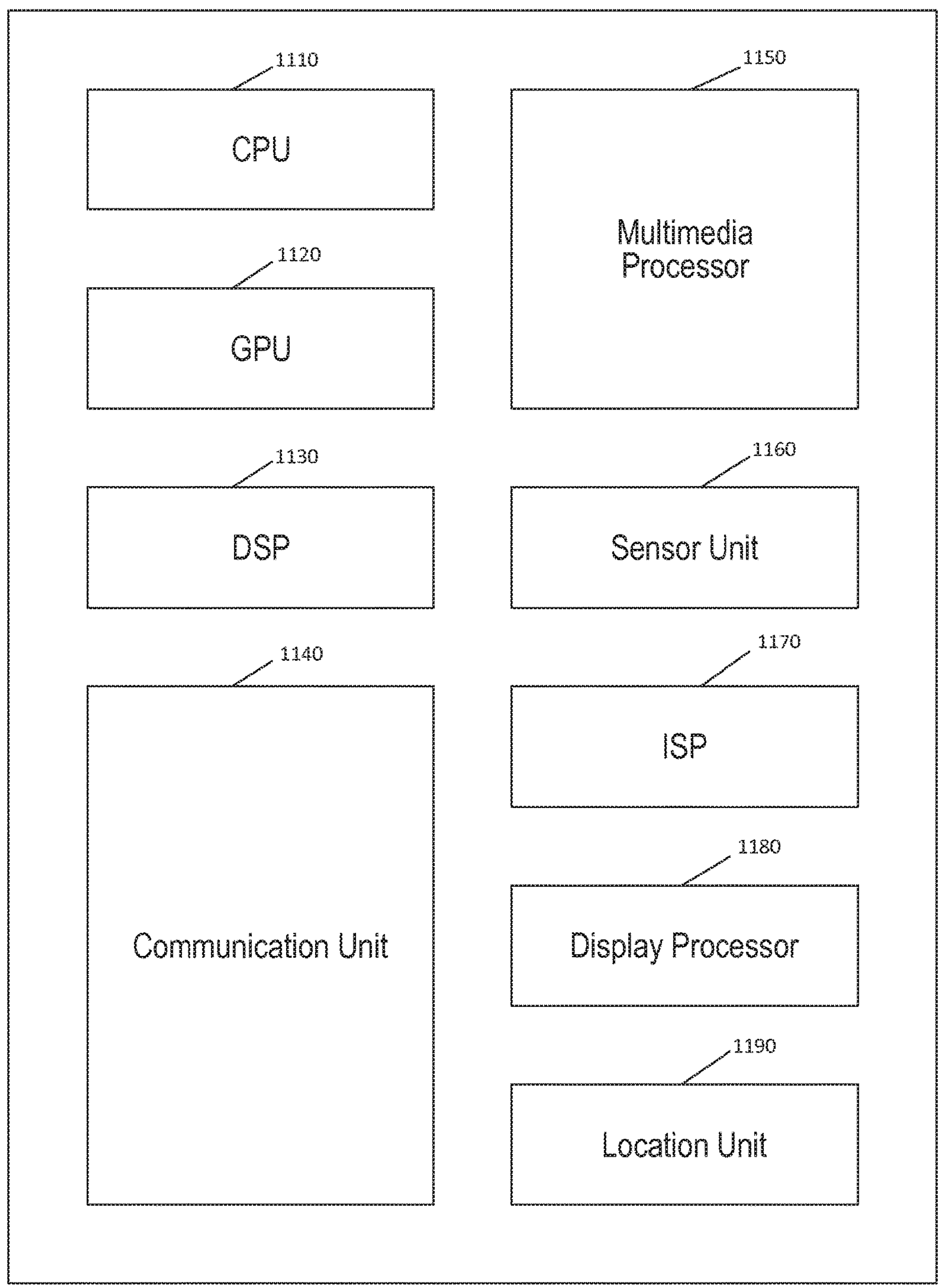
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
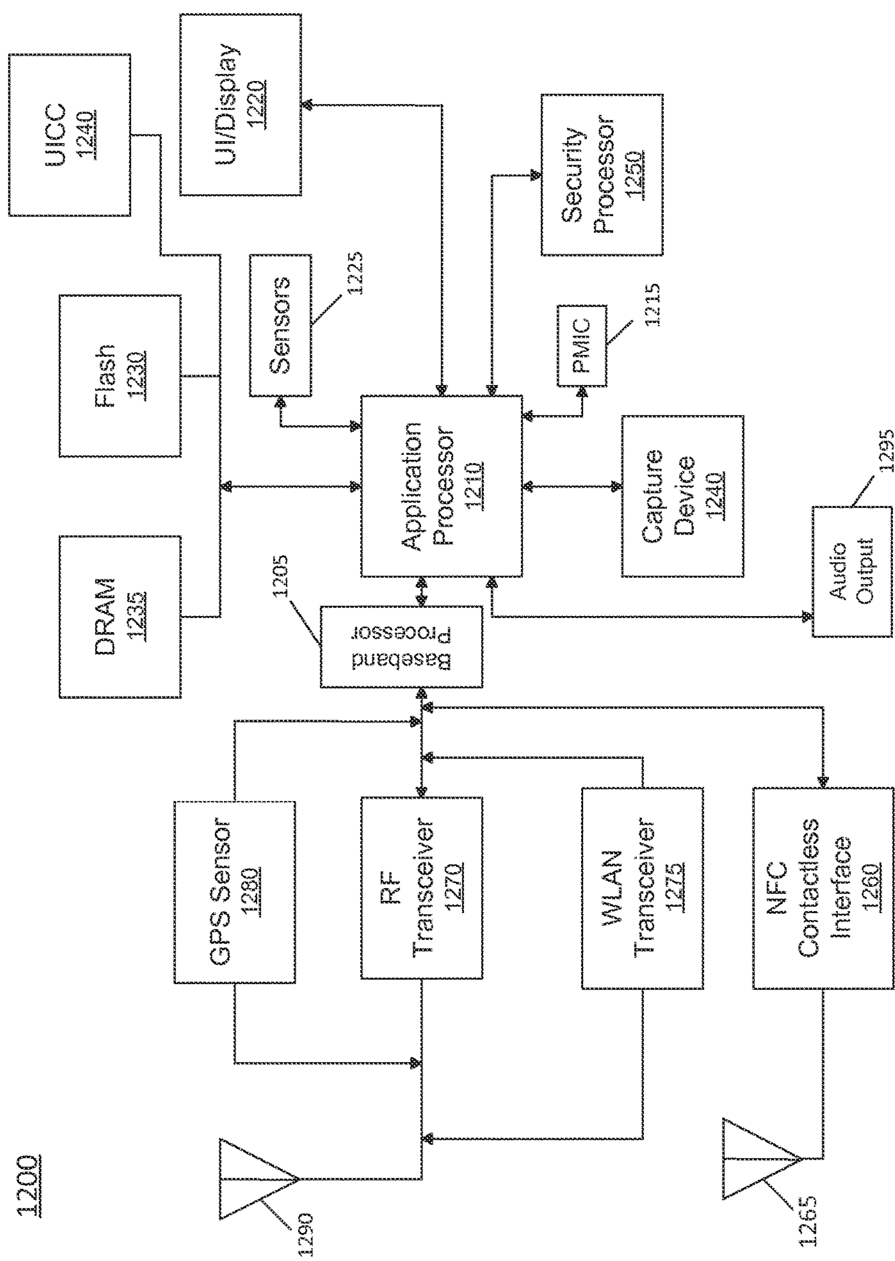
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
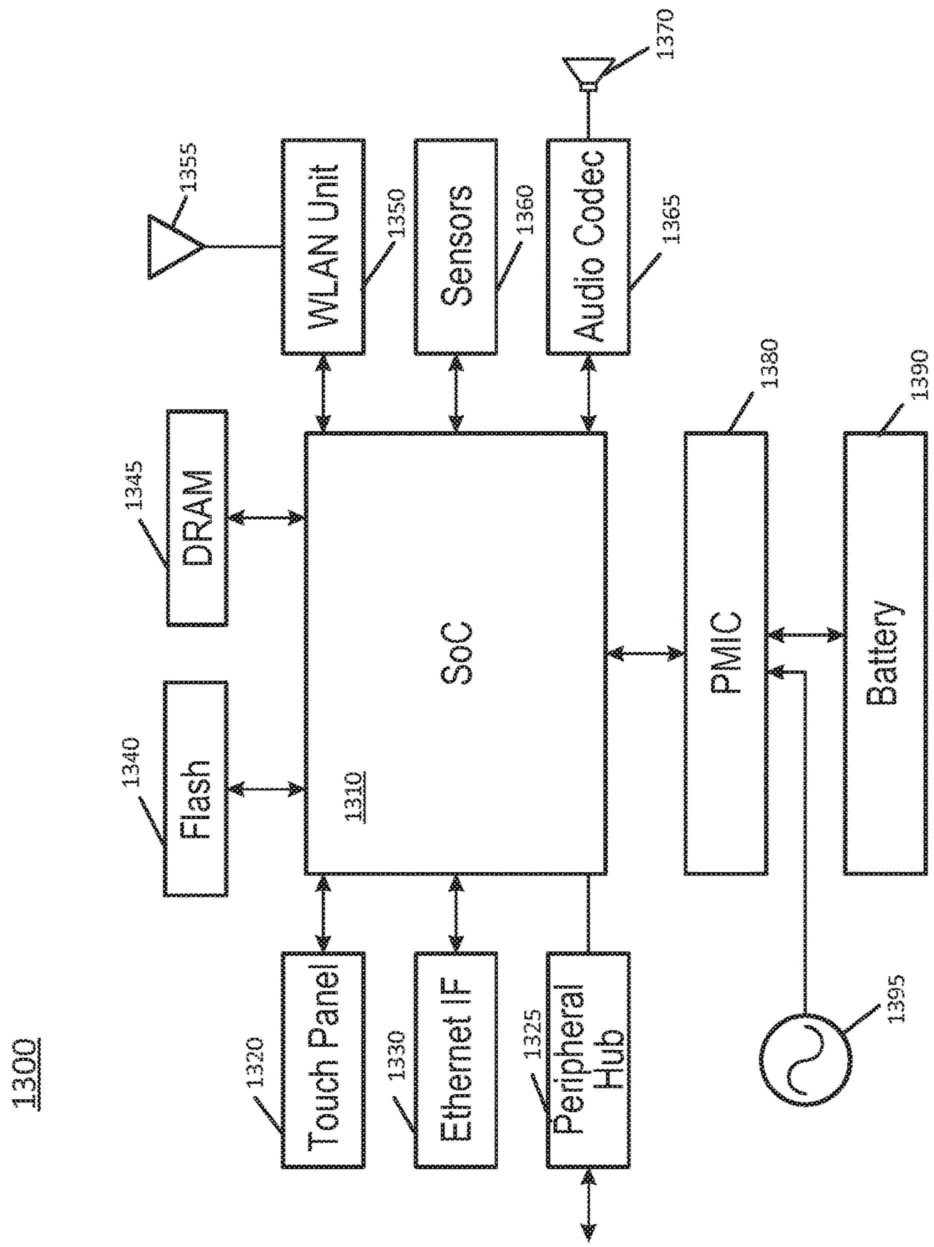
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
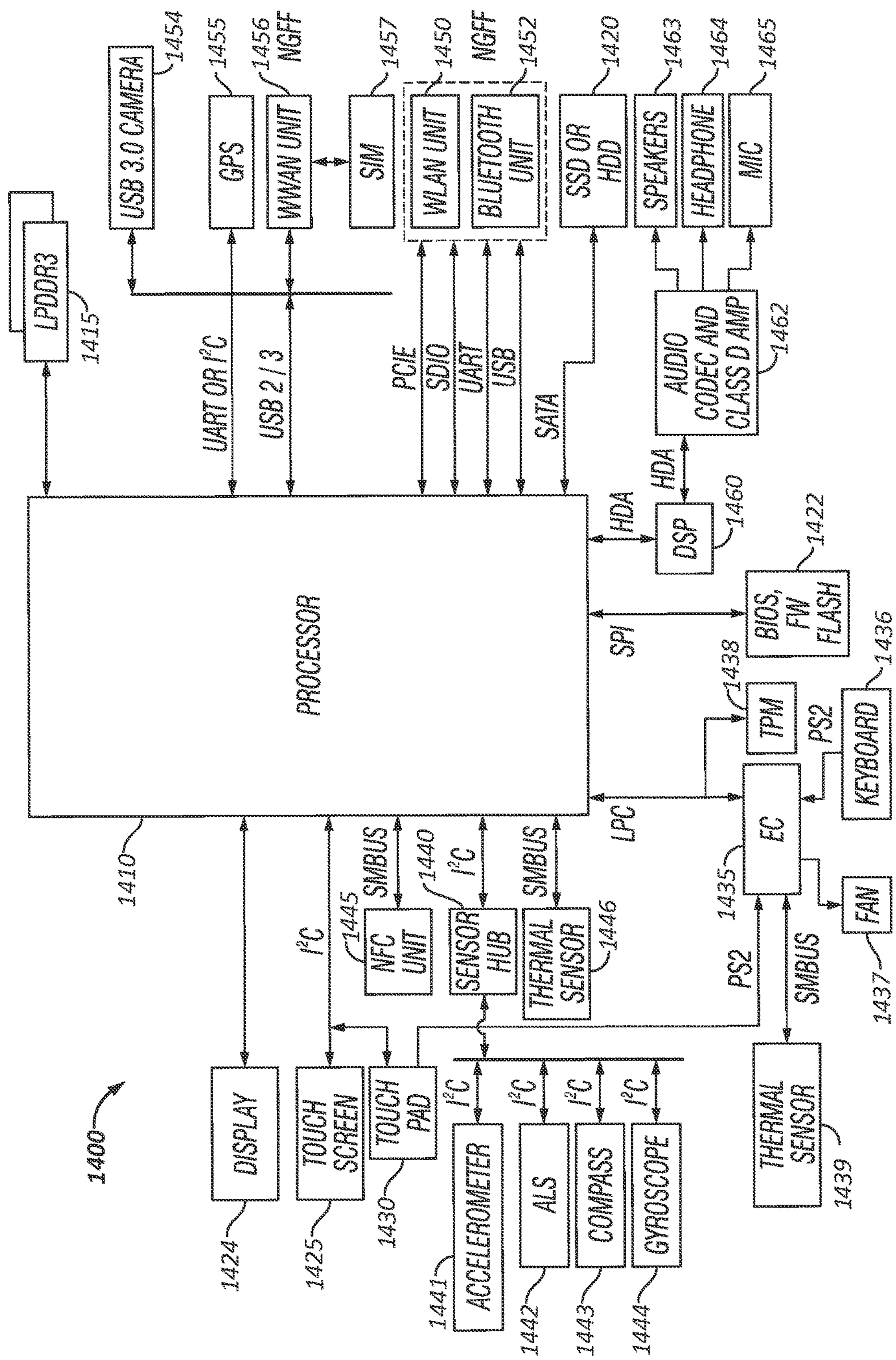
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1410 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an $I^2C$ interconnect. As further shown in FIG. 14, in addition to touch screen 1425, user input by way of touch can also occur via a touch pad 1430 which may be configured within the chassis and may also be coupled to the same $I^2C$ interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an $I^2C$ interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth™ unit 1452. Using WLAN unit 1450, Wi-Fi™ communications can be realized, while via Bluetooth™ unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
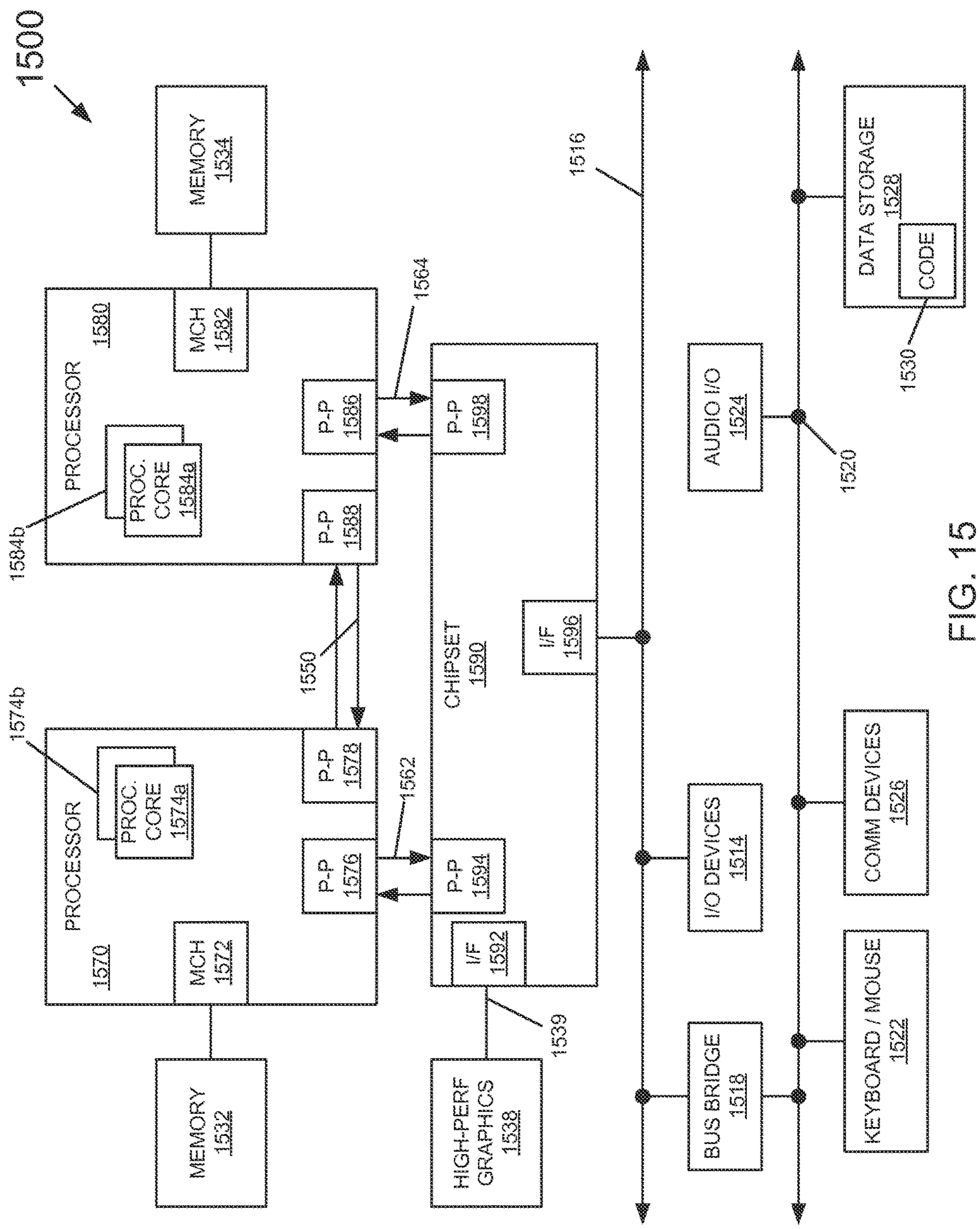
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574*a* and 1574*b* and processor cores 1584*a* and 1584*b*), although potentially many more cores may be present in the processors. Each of the processors can include a PCU or other power management logic to perform processor-based power management. Further understand that processors 1570 and 1580 may include a power arbiter-controlled voltage regulator as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 16:
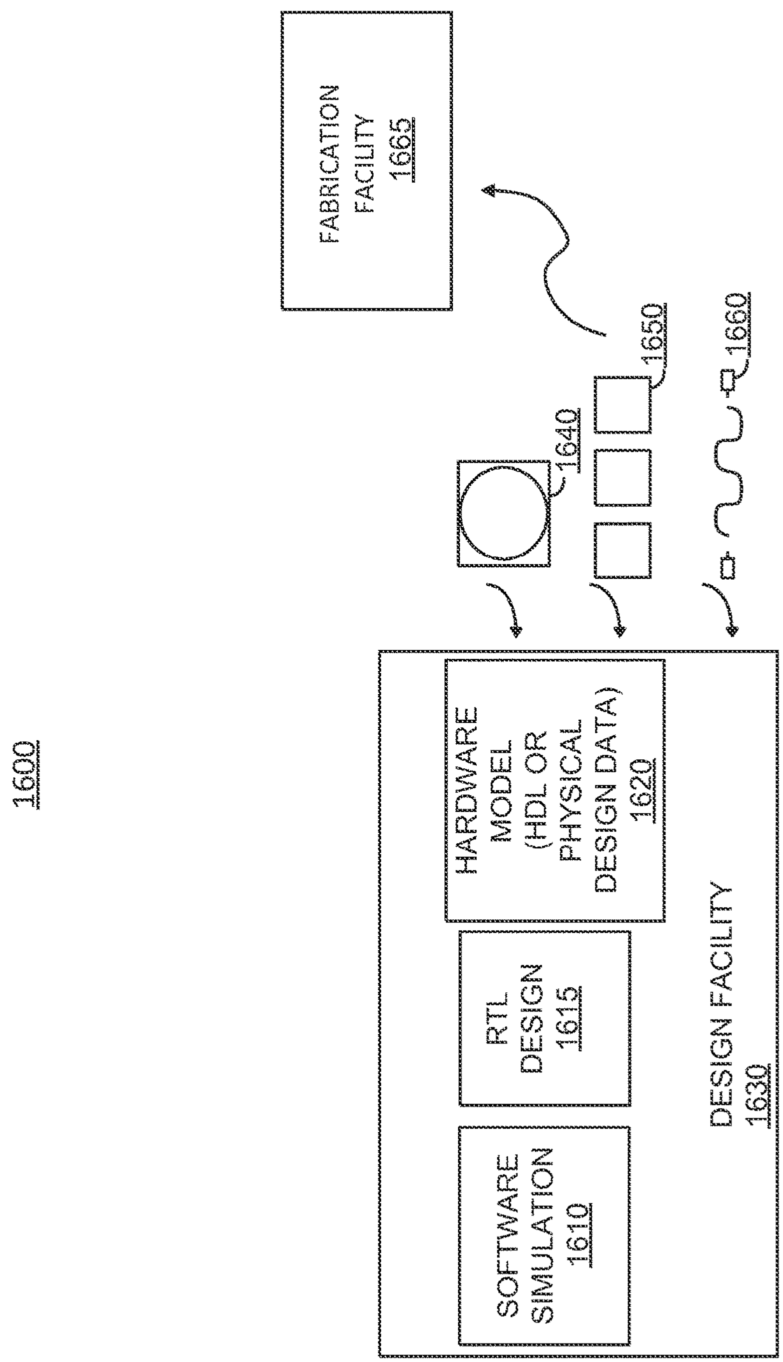
FIG. 16 is a block diagram illustrating an IP core development system used to manufacture an integrated circuit to perform operations according to an embodiment.

FIG. 16 is a block diagram illustrating an IP core development system 1600 that may be used to manufacture an integrated circuit to perform operations according to an embodiment. The IP core development system 1600 may be used to generate modular, reusable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

Figure 17:
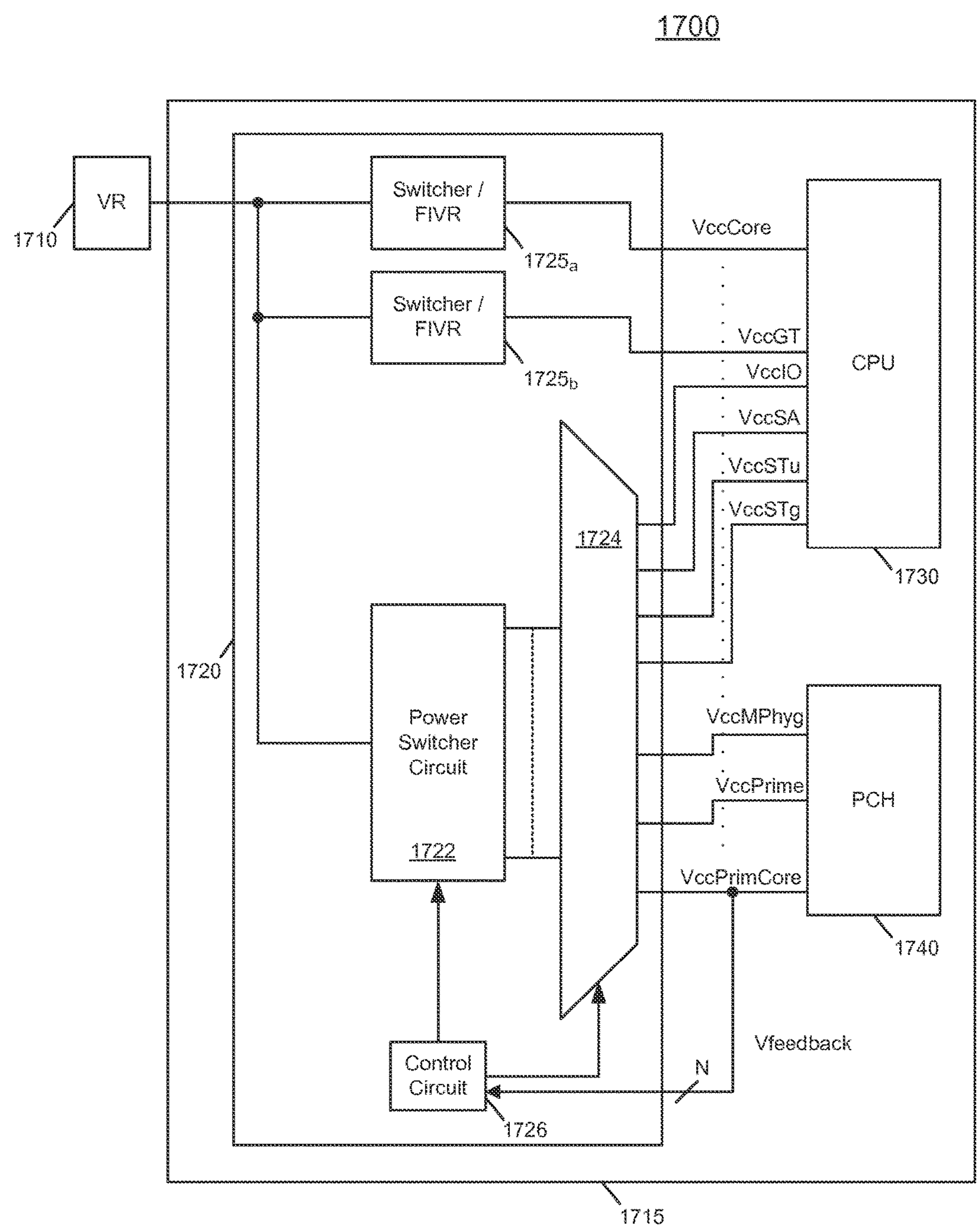
FIG. 17 is a block diagram of a portion of a system in accordance with an embodiment of the present invention.

Referring now to FIG. 17, shown is a block diagram of a portion of a system in accordance with an embodiment of the present invention. As shown in FIG. 17, system 1700 may be any type of computing system, ranging from a small portable device to a desktop personal computer or server computer.

System 1700 includes a voltage regulator 1710 and an integrated circuit 1715, which may be a processor, SoC or any other type of semiconductor device. In the embodiment shown, processor 1715 includes multiple processing domains, including a so-called central processing unit (CPU) domain 1730 which may include one or more processing cores (and which may be a mix of heterogeneous or homogeneous cores). In some cases, domain 1730 may further include other types of processing circuits such as one or more graphics processing units, fixed function units or so forth. In the embodiment shown, integrated circuit 1715 may be a multi-chip module in which domain 1730 is adapted on a first die. And in turn, a second domain 1740 (which may be included on a second die) is shown to include controller circuitry, namely a peripheral controller hub. Understand that in other cases, domains 1730 and 1740 may be implemented on a single semiconductor die. And further understand that each of domains 1730 and 1740 themselves may include multiple independent domains, e.g., each configured to operate at an independent voltage and frequency.

As illustrated, a plurality of different operating voltages is provided to each of these domains. Namely, the operating voltages may be provided at different voltage levels to power different circuitry of the given domains. Some circuitry may operate at higher voltages and higher current consumption levels, such that the circuits may receive operating voltages from dedicated voltage regulator circuitry. Specifically as shown, a core operating voltage (VccCore) is provided as an operating voltage to one or more cores of first domain 1730. And in turn, another operating voltage (VccGT) may be provided to one or more graphics processing units of first domain 1730.

To provide these operating voltages to circuitry having relatively high current consumption levels, dedicated switching circuitry/voltage regulators **1725*a* and 1725*b* are present in an integrated voltage regulator 1720. In an embodiment in which the integrated circuit is implemented as a multi-die package, IVR 1720 may be implemented as another separate die. Of course in another embodiment, IVR 1720 may be implemented on a common die with one or more of domains 1730 and 1740. IVR 1720 receives a first regulated voltage from voltage regulator 1710, which may be an off-chip voltage regulator that provides a regulated voltage to the circuitry of IVR 1720. Understand that there may also be on-chip IVRs within domains 1730 and 1740** to receive and further regulate a received operating voltage (e.g., to provide a regulated voltage at a particular lower voltage to one or more associated circuits).

Dedicated voltage regulators are provided for these higher current consuming circuits by way of fully integrated voltage regulators **1725*a* and 1725*b*. As examples, the IVRs 1725*a* and 1725*b* may be configured to provide an operating voltage from an incoming regulated voltage (e.g., at approximately 1.8 volts) at a current level of approximately 24 Amperes (A). Note that IVRs 1725*a* and 1725*b*** include dedicated switcher circuitry, which can consume chip area. Furthermore, such IVRs may be implemented using magnetic switching circuitry, increasing a bill of materials (such as due to on-board magnetic devices, e.g., inductors).

For a remainder of circuitry within domains 1730 and 1740, a simplified arrangement may be provided without the need for additional dedicated fully integrated voltage regulators within IVR 1720. Thus as shown, a power switcher circuit 1722 is provided also to receive the regulated voltage from voltage regulator 1710.

As will be described herein, power switcher circuit 1722 may provide a central power switching function to prepare charge using a first voltage level from the received regulated voltage (which may be approximately 1.8 volts in an embodiment), and which may be higher than a voltage at which powered circuits are to operate). This arrangement may avoid the need for multiple independent (and cost and space consumption expensive) switcher blocks. In turn, a selection circuit 1724, which in an embodiment may be implemented as a zero-loss multiplexer, may be used to route this stored charge to one of multiple output paths or rails, provided to various circuitry within dies 1730 and 1740. Specifically as shown in FIG. 17, outputs from selection circuit 1724 may provide operating voltages to a plurality of different voltage rails, namely: VccIO; VccSA; VccSTu; VccSTg, all of domain 1730; and VccMPhyg, VccPrime, and VccPrimCore, the last three of which are provided to domains 1740. More specifically, voltage rail VccIO may provide an operating voltage to various input/output (I/O) circuits within first domain 1730. Voltage rail VccSA may provide an operating voltage to system agent circuitry of first domain 1730. In turn, voltage rails VccSTu and VccSTg may provide a sustain voltage (such at a given retention voltage) when corresponding circuitry (e.g., uncore circuitry and graphics circuitry) is placed into a sustain or retention voltage state when processor 1700 (or first domain 1730) is in a deeper low power state. In turn, the VccMPhyg voltage rail may provide an operating voltage to a PHY unit of second domain 1740 (which in an embodiment may include an M-PHY in accordance with a MIPI Specification). In turn, the VccPrime and VccPrimCore voltage rails may provide operating voltages to various cores and other circuitry within second die 1740.

In an embodiment, each of these voltage rails may provide a sensed voltage (Vfeedback) as a feedback signal to a control circuit 1726. Control circuit 1726 may execute an arbitration algorithm to determine which rail is next to be refreshed so that no load circuits are starved and ripple current is low, allowing accurate control over each voltage level. Thus while only a single specific feedback signal Vfeedback from the VccPrimCore voltage rail is illustrated in FIG. 17, understand that similar connection of feedback signals from all of the voltage rails coupled to selection circuit 1724 may be provided to control circuit 1726 (as N feedback signals).

Based at least in part on the feedback information, control circuit 1726 may select which rail is to next be refreshed. In this way, it can be guaranteed that no rail (and corresponding load circuitry) will starve and similarly ensure low ripple current, allowing accurate control over each rail and appropriate voltage level. To this end, power switcher circuit 1722 may operate at a switching frequency sufficient to support all coupled rails. In an embodiment, this switching frequency may be at approximately 140 MHz, with a bandwidth of 100 MHz. As will be described herein, control circuit 1726 may implement a power arbiter circuit that may execute, e.g., according to a round robin arbitration scheme to selectively couple one or more switch connection circuits (present within selection circuit 1724) to enable charge stored in power switcher circuit 1722 to be coupled to selected voltage rails, within a given arbitration round. Note also that while control circuit 1726 is illustrated as being present within IVR 1720, the scope of the present invention is not limited in this regard and in other embodiments, control circuit 1726 may be implemented in one of domains 1730 or 1740 (or in another location). As one such example, control circuit 1726 may be implemented within a PCU of processor 1700 (which in turn may be implemented within first domain 1730).

Control circuit 1726 also may be adapted to identify when a given load circuit is to be in an inactive or other low power state such that its operating voltage need not be provided. To this end, the given rail to provide power to such inactive circuitry may be starved of operating voltage, by excluding this rail from a selection pool to which the output of selection circuit 1724 provides charge. In this way, the expense of one or more power gates on-die or on-board can be reduced or eliminated. Embodiments may further avoid presence of power gates that would be used to enable shared power rails (as each load circuit may be provided with a dedicated voltage rail, powered by the same power arbiter circuit). Note that in other implementations, multiple power arbiters may be provided, each with a set of load circuits, so that a switching frequency can be accommodated to enable appropriate arbitration round switching.

Figure 18A:
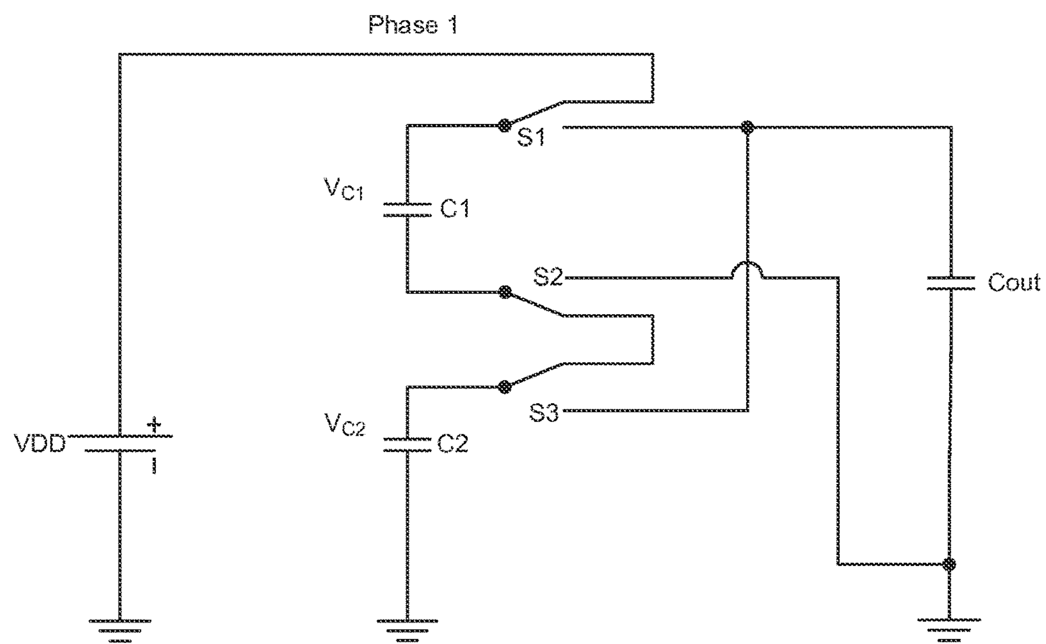
FIG. 18A is a block diagram of an example switch capacitor circuit in accordance with an embodiment of the present invention, in a first phase.

Referring now to FIG. 18A, shown is a block diagram of an example switch capacitor circuit having a multi-phase (e.g., 2-phase) arrangement. Specifically, FIG. 18A shows configuration a first phase of a circuit 1800. In this first phase of activity, a plurality of switches S1-S3 (which as may be implemented as metal oxide semiconductor field effect transistors (MOSFETs) such as power MOSFETs) may be controlled to couple a pair of switch capacitors C1 and C2 in series to a supply voltage ($V_{DD}$) such that these capacitors C1 and C2 are each charged to a voltage of $V_{C1}$ and $V_{C2}$ (e.g., each charged to a value of $V_{DD}/2$). Understand that in some cases switch capacitors C1 and C2 can be implemented within a processor package. As further illustrated, an output capacitance (represented as Cout) may couple to these capacitors (but not in this first phase). In an embodiment, this output capacitance may be implemented within a processor package itself, while in other cases may be implemented as on-board capacitance. In yet other embodiments, the output capacitance can be implemented with self-capacitance of the relevant load circuit. Understand also that while not shown for each of illustration, a load capacitance of a load circuit to which the switch capacitors are coupled (and which is unconnected to capacitors C1 and C2 in this first phase) may be coupled in parallel with Cout.

Figure 18B:
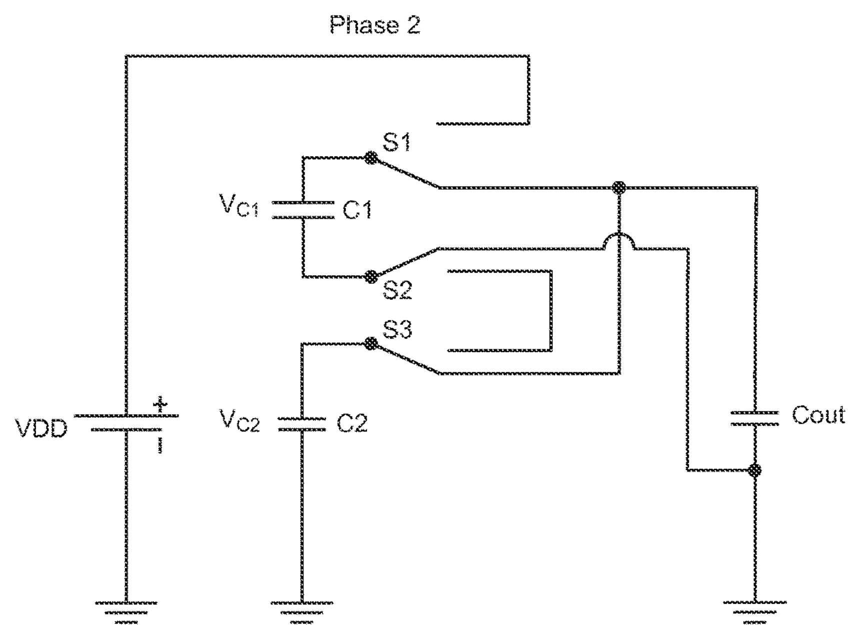
FIG. 18B is a block diagram of an example switch capacitor circuit in accordance with an embodiment of the present invention, in a second phase.

With reference now to FIG. 18B, in the second phase of operation, switches S1-S3 are switched to enable the charge in capacitors C1 and C2 to be provided to the load circuit coupled in parallel with Cout (not shown in FIG. 18B). In this second phase arrangement, switches S1-S3 cause capacitors C1 and C2 to be disconnected from the supply voltage and instead coupled to the output capacitance/coupled load circuit. Note that the target operating voltage may be selected by the capacitor ratio and/or input voltage of the supply voltage. Efficiency of this design may be best suited for a single selective voltage level and may deteriorate when this voltage level is changed. With this design, the presence of expensive inductors can be avoided, and still further low bump or pin count is realized.

In embodiments, this single switch stage, namely a single set of switch capacitors (such as shown in FIGS. 18A-18B), may be used for all loads connected to the switcher circuit/selection circuit described herein. More specifically, in one embodiment power switcher circuit 1722 may be implemented using multiple capacitors (such as capacitors C1 and C2 of FIGS. 18A-18B) and several switches (such as switches S1-S3 of FIGS. 18A-18B). In turn, for each rail to be provided with an operating voltage via this configuration, selection circuit 1724 may include a set of connection switches that implement the zero-loss power multiplexer. To this end, a control circuit may cause the capacitors to connect through a selected set of connection switches to the selected rail (and thus to a selected load circuit) for each switching phase, e.g., according to a given arbitration scheme.

Figure 19:
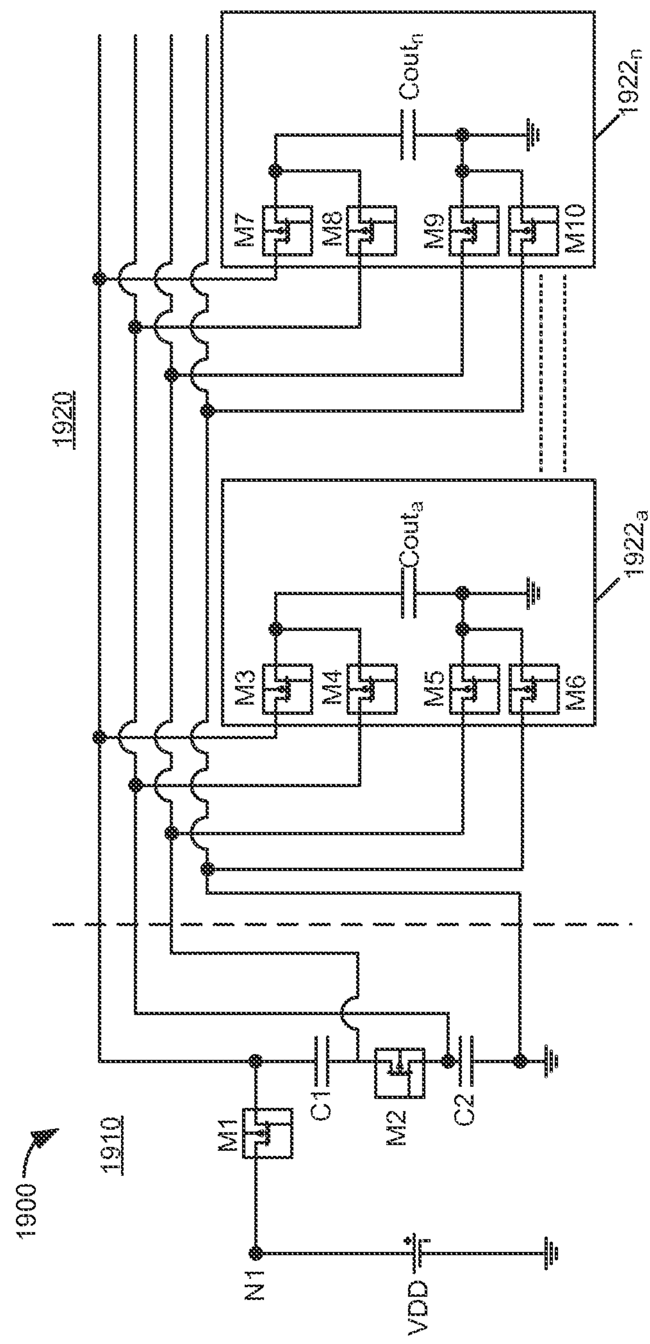
FIG. 19 is a schematic diagram of a power delivery circuit in accordance with an embodiment of the present invention.

Referring now to FIG. 19, shown is a schematic diagram of a power delivery circuit in accordance with an embodiment of the present invention. As shown in FIG. 19, power delivery circuit 1900 includes a power switcher circuit 1910 and a selection circuit 1920. As such, FIG. 19 shows an implementation of a circuit 1900 with circuits 1910 and 1920, which may be specific embodiments of power switcher circuit 1722 and selection circuit 1724 of FIG. 17.

With reference first to power switcher circuit 1910, multiple switch capacitors C1 and C2 are controllably coupled to a supply voltage $V_{DD}$. In various embodiments, $V_{DD}$ may be implemented as a regulated voltage, e.g., provided by an on-chip or off-chip voltage regulator (which in some cases may be powered by a battery voltage, in the case of a portable battery-power device). As further illustrated, two switches M1 and M2 (which may be implemented as power MOSFETs) are provided, with first switch M1 coupled between a supply voltage node N1 and first switch capacitor C1. Second switch M2 is coupled between switch capacitor C1 and switch capacitor C2. To enable appropriate switching of MOSFETs M1 and M2, control signals (e.g., gate voltage signals) may be provided to gate terminals of these MOSFETs not shown in FIG. 19.

When a given voltage rail (and corresponding load circuit(s)) is selected to be provided with charge during an arbitration round, control signals may be provided to enable coupling of switches within a given one of multiple switch connection circuits 1922*a*-1922*n* of a selection circuit 1920. With reference to first switch connection circuit 1922*a*, a plurality of power MOSFETs M3-M6 are provided to enable selective coupling of charge from capacitors C1 and C2 to a corresponding output capacitor $Cout_a$ in turn coupled in parallel with a load circuit (which may represent the load circuitry, not shown for ease of illustration in FIG. 19). This enabling may be for a given portion of an arbitration round in which the corresponding rail/load circuit is selected. Assume that in another portion of the arbitration round, load circuitry coupled to switch circuit 1922*n* is selected to receive charge. In this instance, power MOSFETs M7-M10 may be enabled to couple capacitors C1 and C2 to output capacitor Coutn (and coupled load circuits). Understand while shown at this high level in the embodiment of FIG. 19, many variations and alternatives are possible.

In an embodiment having 7 load circuits, reductions in the number of switch capacitors, internal switches and pin counts can be realized. In one such embodiment, an architecture as described herein may use the following to connect to 7 load circuits:

switch capacitors: 2;

output capacitors: 1*7=7 (or more generally N, where N is the number of voltage rails) (in some cases, these capacitors may be implemented within a processor package);

internal switches: 2 (e.g., M1 and M2 in FIG. 19)+4 (e.g., M3-M6 in FIG. 19)*7=30 (or more generally 2+4N); and pin count: 6+2*7=18 (or more generally 6+2N).

Figure 20:
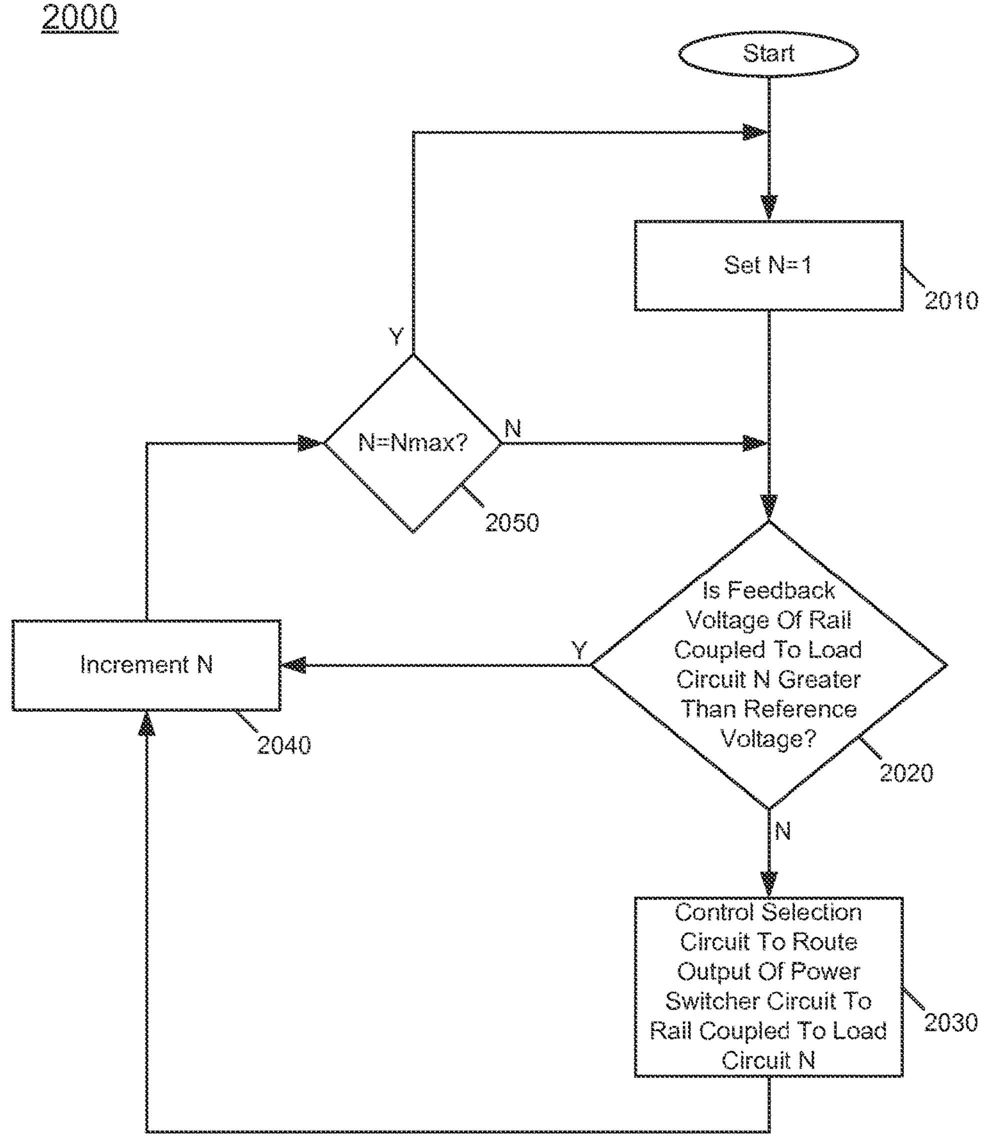
FIG. 20 is a flow diagram of a method in accordance with an embodiment of the present invention.

Referring now to FIG. 20, shown is a flow diagram of a method in accordance with an embodiment of the present invention. More specifically, method 2000 of FIG. 20 may be performed by various combinations of hardware, software and/or firmware, including for example, a control circuit such as a microcontroller or other control logic configured to perform method 2000 to enable appropriate operating voltage control during arbitration rounds. In one embodiment, method 2000 of FIG. 20 may be performed in a control circuit within voltage regulator circuitry as described herein to enable selection of an appropriate one or multiple load circuits to receive charge during given portions of an arbitration round setting a variable.

As shown in FIG. 20, method 2000 begins by setting a variable N to a value of 1 (bock 2010). This variable or load circuit value identifies one of N different load circuits (and/or voltage rails) to which an operating voltage may be applied using arbitration techniques as described herein. Next, control passes to diamond 2020 where it is determined whether a feedback voltage of a rail coupled to this load circuit N is greater than a reference voltage. In an embodiment, the feedback voltage may be received in the control circuit from a sensed value of the given voltage rail. In some embodiments this sensed voltage may be applied through an analog-to-digital converter (ADC) to provide a digital value corresponding to the operating voltage. In other cases, the sensed voltage may be converted into a so-called voltage identifier (VID) value. In any case, this feedback value is compared to a reference voltage. In some cases there may be a single reference voltage to which the feedback voltage of each of the load circuits can be compared. In other cases, each operating voltage rail may have a corresponding reference voltage (such as stored in a configuration storage included in or coupled to the control circuit).

If it is determined at diamond 2020 that the feedback voltage is greater than the reference voltage, this means that there is no need to provide further charge to that rail for the arbitration round. As such, control passes to block 2040 where the value of N can be incremented. Then at diamond 2050 it is determined whether N has reached Nmax (which corresponds to the number of load circuits to be powered by the power switching circuitry described herein). If so, control passes to block 2010 where another arbitration round may be begun. Otherwise if N is incremented and does not exceed Nmax, control passes to diamond 2020 to compare the next feedback voltage for determining whether an appropriate operating voltage is present for another load circuit in a next portion of the arbitration round.

Still with reference to FIG. 20 if at diamond 2020 it is determined that that the feedback voltage of a rail is less than the reference voltage, control passes to block 2030 where the selection circuit may be controlled to route the output of the power switcher circuit to the given rail. As such, for this portion of the arbitration round, charge is applied to this voltage rail to enable the operating voltage to be increased.

Note that while described with this high level in the embodiment of FIG. 20, many variations and alternatives are possible. For example, in some embodiments priority considerations may be taken into account. That is, in a case where one or more load circuits are indicated to have a higher priority (e.g., based on configuration information to indicate that one or more load circuits are more important and thus have a higher priority), the comparison of feedback voltage to reference voltage and possible provision of charge to a given rail may be performed during multiple independent portions of the arbitration round. In this or other cases, it is also possible to receive status information regarding state of the load circuits. That is, if this status information indicates that a given load circuit is in an inactive or low power state, such circuits may be bypassed in the arbitration round and thus there is no need to perform the voltage feedback comparison or any charge provision to corresponding voltage rails. Instead, voltage rails coupled to such inactive load circuits can be starved during multiple arbitration rounds while load circuits are in such low power state.

The following examples pertain to further embodiments.

In one example, a processor comprises: a plurality of cores; a plurality of load circuits; a first voltage regulator to provide an operating voltage to one or more of the plurality of cores; a power switcher circuit to receive a first voltage and charge at least one charge storage device with the first voltage in a first phase and output charge in a second phase; a selection circuit coupled to the power switcher circuit, the selection circuit to couple the output charge to a selected one of the plurality of load circuits responsive to a control signal; and a control circuit to generate the control signal based at least in part on a comparison of a feedback voltage of a rail coupled to the selected load circuit to a reference voltage.

In an example, the control circuit comprises an arbiter to provide the output charge to one or more of the plurality of load circuits in an arbitration round.

In an example, the arbiter is to provide the output charge to a first load circuit when the feedback voltage of a first rail coupled to the first load circuit is less than a first reference voltage.

In an example, the arbiter is to provide the output charge to a first load circuit in a plurality of portions of the arbitration round, the first load circuit having a first priority.

In an example, the arbiter is to prevent the output charge from being provided to a first load circuit, when the first load circuit is in a low power state.

In an example, the processor comprises a processor package comprising a first die including the plurality of cores and a second die including the power switcher circuit and the selection circuit, where the first die further comprises one or more integrated voltage regulators to receive the operating voltage and to provide a voltage level to at least one of the plurality of cores.

In an example, the second die further comprises the control circuit.

In an example, the processor package further comprises a third die including a peripheral controller, the third die to receive the output charge from the selection circuit.

In an example, the power switcher circuit comprises: a first switch to switchably provide the first voltage to a first capacitor; and a second switch to switchably couple the first capacitor to a second capacitor, where in the first phase, the first switch and the second switch are to cause the first and second capacitors to be charged with the first voltage.

In an example, the first switch is to decouple the first capacitor and the second capacitor from receipt of the first voltage in the second phase.

In an example, the selection circuit comprises a plurality of switch connection circuits each to couple the at least one charge storage device to a corresponding one of the plurality of load circuits in the second phase, when enabled.

In an example, the plurality of switch connection circuits comprises zero-loss switching circuitry.

In an example, the processor further comprises an integrated voltage regulator including the power switcher circuit, the control circuit and the plurality of switch connection circuits, each of the plurality of switch connection circuits to switchably couple the power switcher circuit to a rail coupled to one of the plurality of load circuits.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprises: receiving a first feedback voltage from a first voltage rail coupled to a first load circuit of a plurality of load circuits of the at least one integrated circuit; comparing the first feedback voltage to a first reference voltage; and based on the comparison, controlling a first switch connection circuit to couple a charge storage device to the first voltage rail for a first portion of an arbitration round, where the first switch connection circuit is associated with the first load circuit, and the charge storage device comprises a global charge storage device to be shared by the plurality of load circuits.

In an example, the method further comprises controlling the first switch connection circuit to not couple the charge storage device to the first voltage rail when the first feedback voltage is at least equal to the first reference voltage.

In an example, the method further comprises controlling the first switch connection circuit to couple the charge storage device to the first voltage rail for multiple portions of the arbitration round, based on a priority of the first load circuit.

In an example, the method further comprises controlling the first switch connection circuit to prevent the charge storage device from being coupled to the first voltage rail for a plurality of arbitration rounds, where during the plurality of arbitration rounds, the first load circuit is in a low power state.

In an example, the method further comprises: receiving a second feedback voltage from a second voltage rail coupled to a second load circuit of the plurality of load circuits; comparing the second feedback voltage to a second reference voltage; and based on the comparison, controlling a second switch connection circuit to couple the charge storage device to the second voltage rail for a second portion of the arbitration round, where the second switch connection circuit is associated with the second load circuit.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a processor including: a first die having a plurality of cores, at least one cache memory, and at least one I/O interface; and a second die having an integrated voltage regulator. In turn, the integrated voltage regulator may comprise: a switch capacitor circuit to receive a first voltage and charge at least one capacitor with the first voltage in a first phase and output charge in a second phase; a selection circuit coupled to the switch capacitor circuit to couple the output charge to a selected one of a plurality of voltage rails coupled to the first die according to a power arbitration; and a control circuit to perform the power arbitration, based at least in part on feedback information from one or more of the plurality of voltage rails. The system may further include a system memory coupled to the processor.

In an example, the control circuit comprises an arbiter to perform the power arbitration, to cause the output charge to be provided to one or more of the plurality of voltage rails in an arbitration round, where the arbiter is to cause the output charge to be provided to a first voltage rail based on a comparison of a feedback voltage of the first voltage rail to a first reference voltage.

In an example, the arbiter is to provide the output charge to the first voltage rail in a plurality of portions of the arbitration round, based at least in part on a priority of a first load circuit coupled to the first voltage rail.

In an example, the switch capacitor circuit comprises: a first switch to switchably provide the first voltage to a first capacitor; and a second switch to switchably couple the first capacitor to a second capacitor, where in the first phase, the first switch and the second switch are to cause the first and second capacitors to be charged with the first voltage.

In an example, the selection circuit comprises a plurality of switch connection circuits each to couple the first and second capacitors to a corresponding one of the plurality of voltage rails in the second phase, when enabled.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:

a plurality of cores;

a plurality of load circuits;

a first voltage regulator to provide an operating voltage to one or more of the plurality of cores;

a power switcher circuit to receive a first voltage and charge at least one charge storage device with the first voltage in a first phase and output charge in a second phase;

a selection circuit coupled to the power switcher circuit, the selection circuit to couple the output charge to a selected one of the plurality of load circuits responsive to a control signal; and a control circuit to generate the control signal based at least in part on a comparison of a feedback voltage of a rail coupled to the selected load circuit to a reference voltage.

2. The processor of claim 1, wherein the control circuit comprises an arbiter to provide the output charge to one or more of the plurality of load circuits in an arbitration round.

3. The processor of claim 2, wherein the arbiter is to provide the output charge to a first load circuit when the feedback voltage of a first rail coupled to the first load circuit is less than a first reference voltage.

4. The processor of claim 2, wherein the arbiter is to provide the output charge to a first load circuit in a plurality of portions of the arbitration round, the first load circuit having a first priority.

5. The processor of claim 2, wherein the arbiter is to prevent the output charge from being provided to a first load circuit, when the first load circuit is in a low power state.

6. The processor of claim 1, wherein the processor comprises a processor package comprising a first die including the plurality of cores and a second die including the power switcher circuit and the selection circuit, wherein the first die further comprises one or more integrated voltage regulators to receive the operating voltage and to provide a voltage level to at least one of the plurality of cores.

7. The processor of claim 6, wherein the second die further comprises the control circuit.

8. The processor of claim 6, wherein the processor package further comprises a third die including a peripheral controller, the third die to receive the output charge from the selection circuit.

9. The processor of claim 1, wherein the power switcher circuit comprises:

a first switch to switchably provide the first voltage to a first capacitor; and a second switch to switchably couple the first capacitor to a second capacitor, wherein in the first phase, the first switch and the second switch are to cause the first and second capacitors to be charged with the first voltage.

10. The processor of claim 9, wherein the first switch is to decouple the first capacitor and the second capacitor from receipt of the first voltage in the second phase.

11. The processor of claim 1, wherein the selection circuit comprises a plurality of switch connection circuits each to couple the at least one charge storage device to a corresponding one of the plurality of load circuits in the second phase, when enabled.

12. The processor of claim 11, wherein the plurality of switch connection circuits comprises zero-loss switching circuitry.

13. The processor of claim 12, wherein the processor further comprises an integrated voltage regulator including the power switcher circuit, the control circuit and the plurality of switch connection circuits, each of the plurality of switch connection circuits to switchably couple the power switcher circuit to a rail coupled to one of the plurality of load circuits.

14. A non-transitory machine-readable medium having stored thereon data, which when used by at least one machine, causes the at least one machine to fabricate at least one integrated circuit to perform a method comprising:

receiving a first feedback voltage from a first voltage rail coupled to a first load circuit of a plurality of load circuits of the at least one integrated circuit;

comparing the first feedback voltage to a first reference voltage; and based on the comparison, controlling a first switch connection circuit to couple a charge storage device to the first voltage rail for a first portion of an arbitration round, wherein the first switch connection circuit is associated with the first load circuit, and the charge storage device comprises a global charge storage device to be shared by the plurality of load circuits.

15. The non-transitory machine-readable medium of claim 14, wherein the method further comprises controlling the first switch connection circuit to not couple the charge storage device to the first voltage rail when the first feedback voltage is at least equal to the first reference voltage.

16. The non-transitory machine-readable medium of claim 14, wherein the method further comprises controlling the first switch connection circuit to couple the charge storage device to the first voltage rail for multiple portions of the arbitration round, based on a priority of the first load circuit.

17. The non-transitory machine-readable medium of claim 14, wherein the method further comprises controlling the first switch connection circuit to prevent the charge storage device from being coupled to the first voltage rail for a plurality of arbitration rounds, wherein during the plurality of arbitration rounds, the first load circuit is in a low power state.

18. The non-transitory machine-readable medium of claim 14, wherein the method further comprises:

receiving a second feedback voltage from a second voltage rail coupled to a second load circuit of the plurality of load circuits;

comparing the second feedback voltage to a second reference voltage; and based on the comparison, controlling a second switch connection circuit to couple the charge storage device to the second voltage rail for a second portion of the arbitration round, wherein the second switch connection circuit is associated with the second load circuit.

19. A system comprising:

a processor including:

a first die having a plurality of cores, at least one cache memory, and at least one input/output (I/O) interface;

a second die having an integrated voltage regulator, the integrated voltage regulator comprising:

a switch capacitor circuit to receive a first voltage and charge at least one capacitor with the first voltage in a first phase and output charge in a second phase;

a selection circuit coupled to the switch capacitor circuit to couple the output charge to a selected one of a plurality of voltage rails coupled to the first die according to a power arbitration; and a control circuit to perform the power arbitration, based at least in part on feedback information from one or more of the plurality of voltage rails; and a system memory coupled to the processor.

20. The system of claim 19, wherein the control circuit comprises an arbiter to perform the power arbitration, to cause the output charge to be provided to one or more of the plurality of voltage rails in an arbitration round, wherein the arbiter is to cause the output charge to be provided to a first voltage rail based on a comparison of a feedback voltage of the first voltage rail to a first reference voltage.

21. The system of claim 20, wherein the arbiter is to provide the output charge to the first voltage rail in a plurality of portions of the arbitration round, based at least in part on a priority of a first load circuit coupled to the first voltage rail.

22. The system of claim 19, wherein the switch capacitor circuit comprises:

a first switch to switchably provide the first voltage to a first capacitor; and a second switch to switchably couple the first capacitor to a second capacitor, wherein in the first phase, the first switch and the second switch are to cause the first and second capacitors to be charged with the first voltage.

23. The system of claim 22, wherein the selection circuit comprises a plurality of switch connection circuits each to couple the first and second capacitors to a corresponding one of the plurality of voltage rails in the second phase, when enabled.

* * * * *